(12) United States Patent
Sclafani et al.

(10) Patent No.: US 10,773,786 B2
(45) Date of Patent: Sep. 15, 2020

(54) AIRCRAFT WITH STRUT-BRACED WING SYSTEM

(71) Applicant: The Boeing Company, Chicago, IL (US)

(72) Inventors: Anthony J. Sclafani, Alta Loma, CA (US); Adam D. Grasch, Santa Monica, CA (US); Christopher K. Droney, Long Beach, CA (US); Neal A. Harrison, Lake Forest, CA (US)

(73) Assignee: The Boeing Company, Chicago, IL (US)

( * ) Notice: Subject to any disclaimer, the term of this patent is extended or adjusted under 35 U.S.C. 154(b) by 469 days.

(21) Appl. No.: 15/614,834

(22) Filed: Jun. 6, 2017

(65) Prior Publication Data

US 2018/0281926 A1  Oct. 4, 2018

Related U.S. Application Data

(63) Continuation-in-part of application No. 15/476,089, filed on Mar. 31, 2017, now Pat. No. 10,556,666.

(51) Int. Cl.
*B64C 7/00* (2006.01)
*B64C 1/26* (2006.01)
(Continued)

(52) U.S. Cl.
CPC .................. *B64C 1/26* (2013.01); *B64C 3/14* (2013.01); *B64C 3/16* (2013.01)

(58) Field of Classification Search
CPC .......... B64C 1/26; B64C 39/08; B64C 35/00; B64C 35/16; B64C 35/14; B64C 7/00; B64C 3/52; B64D 29/02; B64D 27/12
See application file for complete search history.

(56) References Cited

U.S. PATENT DOCUMENTS 1,995,090 A     3/1935  Bellanca
2,643,076 A  *  6/1953  Hurel ........................ B64C 3/00
                                                         244/13
(Continued)

FOREIGN PATENT DOCUMENTS

WO        2015150818         8/2015

OTHER PUBLICATIONS

Ko et al, Transonic Aerodynamics of a Wing/Pylon/Strut Juncture, 2003, AIAA (Year: 2003).*

(Continued)

*Primary Examiner* — Medhat Badawi
*Assistant Examiner* — Vicente Rodriguez
(74) *Attorney, Agent, or Firm* — Kunzler Bean & Adamson

(57) ABSTRACT

An aircraft that comprises a body, a wing, and a strut. The wing is coupled to and extends from the body. The wing comprises a wing inboard end portion, a wing outboard end portion, opposite the wing inboard end portion, and an intermediate portion between the wing inboard end portion and the wing outboard end portion. The strut comprises a strut inboard end portion and a strut outboard end portion. The strut inboard end portion is coupled to and extends from the body and the strut outboard end portion is coupled to and extends from the intermediate portion of the wing. The strut outboard end portion of the strut is configured to generate a download acting on the strut outboard end portion of the strut when the aircraft is in flight.

20 Claims, 16 Drawing Sheets

(51) Int. Cl.
*B64C 3/16* (2006.01)
*B64C 3/14* (2006.01)

(56) References Cited

U.S. PATENT DOCUMENTS

| | | | |
|---|---|---|---|
| 4,235,400 A | | 11/1980 | Haworth |
| 6,340,134 B1* | | 1/2002 | Meschino ................. B64C 1/26 244/130 |
| 8,141,815 B1* | | 3/2012 | Hoisington ........... B64C 39/068 244/37 |
| 9,415,856 B2 | | 8/2016 | Rawdon et al. |
| 9,481,450 B2 | | 11/2016 | Pitt et al. |
| 9,598,176 B2 | | 3/2017 | Giamati et al. |
| 10,040,559 B2 | | 8/2018 | Hoisington |
| 10,279,891 B2* | | 5/2019 | Krebs ....................... B64C 3/52 |
| 2013/0020433 A1* | | 1/2013 | Hoisington ............ B64D 27/12 244/62 |
| 2017/0113779 A1* | | 4/2017 | Wright ..................... B64C 3/56 |

OTHER PUBLICATIONS

Ko et al, A-7 Strut Braced Wing Concept Transonic Wing Design, 2002, NASA (Year: 2002).*
U.S. Appl. No. 15/928,429 dated Mar. 22, 2018.
Norris, "Truss-Braced Wings May Find Place on Transonic Aircraft," Aviation Week & Space Technology, Mar. 25, 2016, accessed from http://www.w54.biz/showthread.php?3304-Truss-Braced-Wings-May-Find-Place-On-Transonic-Aircraft on Mar. 23, 2017.

* cited by examiner

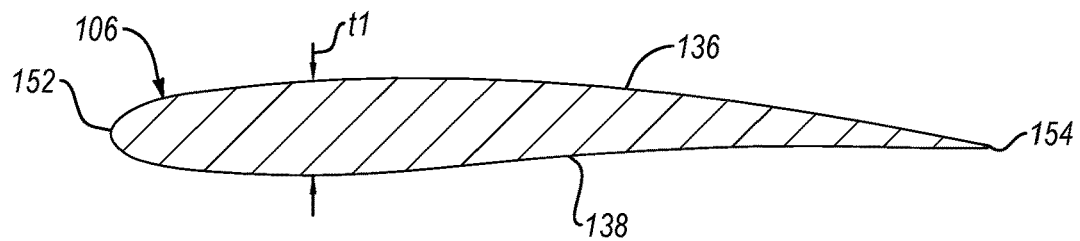
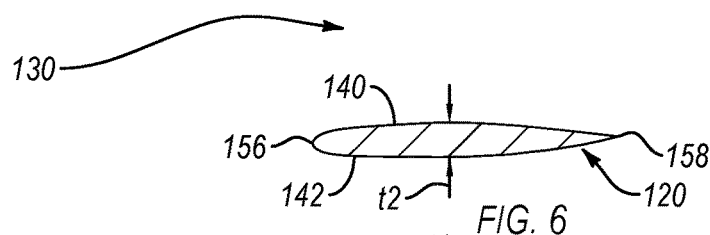
FIG. 6
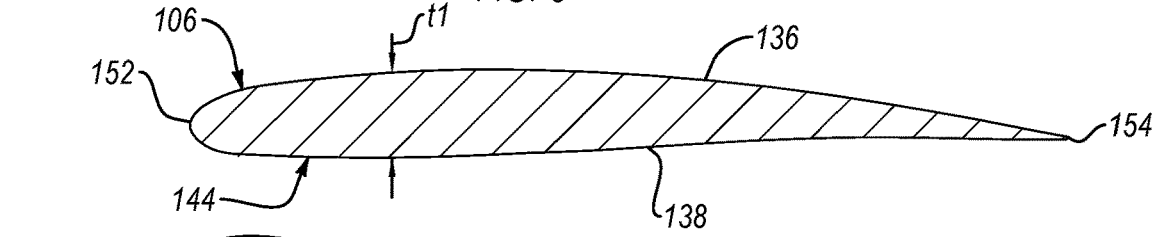
FIG. 7
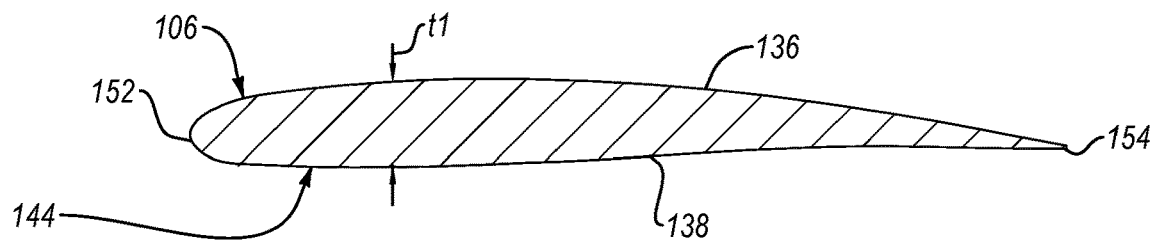
FIG. 8
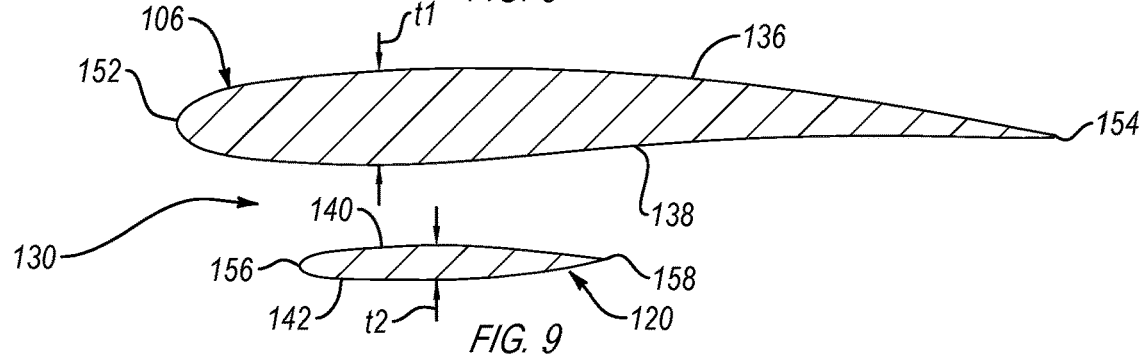
FIG. 9

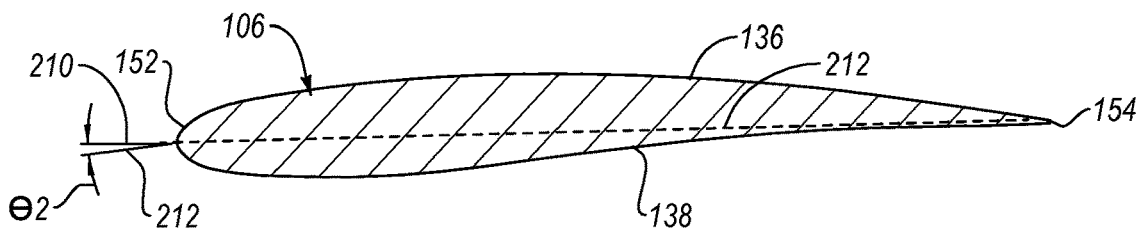
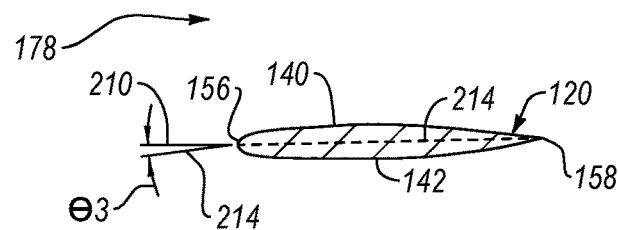
FIG. 16
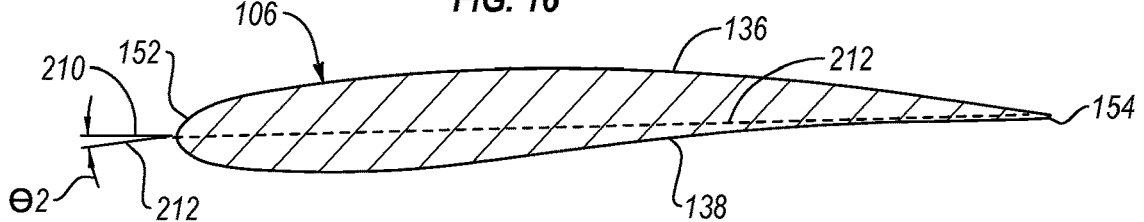
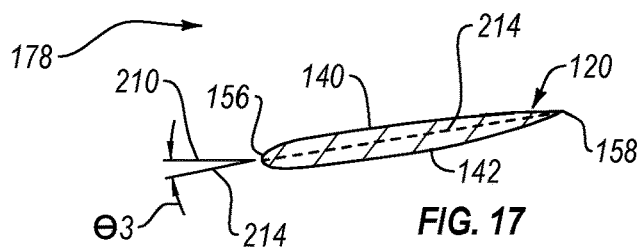
FIG. 17
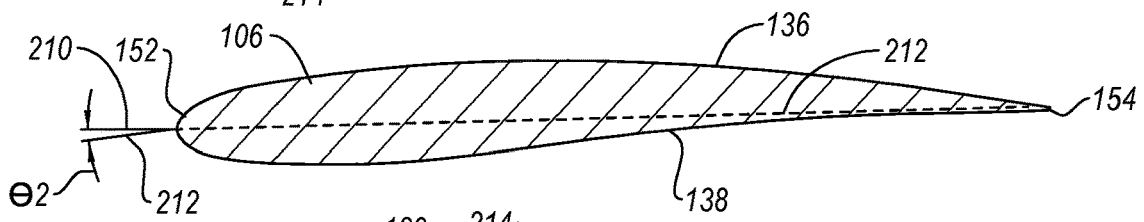
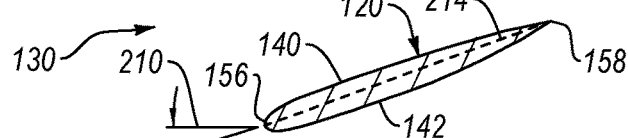
FIG. 18
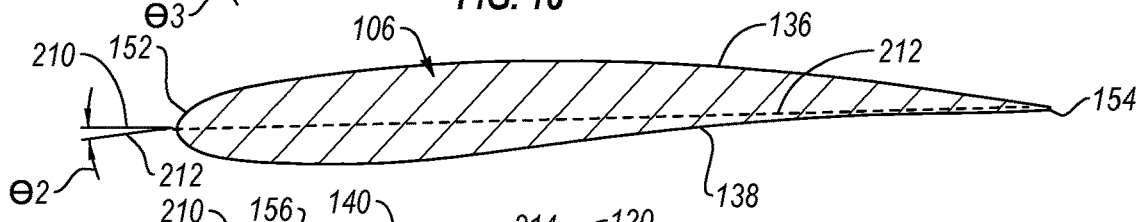
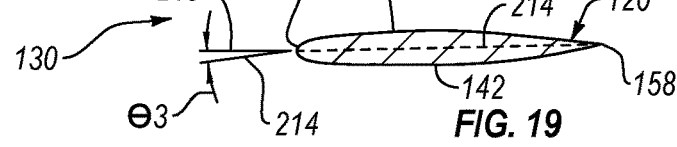
FIG. 19

AIRCRAFT WITH STRUT-BRACED WING SYSTEM

CROSS-REFERENCE TO RELATIVE APPLICATION

This application is a continuation-in-part of U.S. patent application Ser. No. 15/476,089, filed Mar. 31, 2017, which is incorporated by reference herein.

GOVERNMENT LICENSE RIGHTS

This invention was made with Government support under Contract No. NNL10AA05B awarded by National Aeronautics and Space Administration (NASA). The Government has certain rights in this invention.

FIELD

This disclosure relates generally to mobile vehicles, and more particularly to aircraft with wings braced by struts.

BACKGROUND

Some aircraft employ struts or trusses to brace and stiffen wings. Such struts create a channel between the struts and the wings. Under certain operating conditions, shockwaves can form within the channel between the struts and wings. At transonic speeds, shockwaves generally cause an increase in the interference drag acting on the wings and struts. Higher interference drag can lead to a lower flight efficiency of an aircraft.

SUMMARY

The subject matter of the present application has been developed in response to the present state of the art, and in particular, in response to the problems and disadvantages associated with the strut-braced wing systems of conventional aircraft operating at transonic speeds, that have not yet been fully solved by currently available techniques. Accordingly, the subject matter of the present application has been developed to provide an aircraft with a strut-braced wing system that overcomes at least some of the above-discussed shortcomings of prior art techniques.

Disclosed herein is an aircraft that comprises a body, a wing, and a strut. The wing is coupled to and extends from the body. The wing comprises a wing inboard end portion, a wing outboard end portion, opposite the wing inboard end portion, and an intermediate portion between the wing inboard end portion and the wing outboard end portion. The strut comprises a strut inboard end portion and a strut outboard end portion. The strut inboard end portion is coupled to and extends from the body and the strut outboard end portion is coupled to and extends from the intermediate portion of the wing. The strut outboard end portion of the strut is configured to generate a download acting on the strut outboard end portion of the strut when the aircraft is in flight. The preceding subject matter of this paragraph characterizes example 1 of the present disclosure.

The intermediate portion of the wing is configured to generate an upload acting on the intermediate portion of the wing when the aircraft is in flight. The preceding subject matter of this paragraph characterizes example 2 of the present disclosure, wherein example 2 also includes the subject matter according to example 1, above.

A magnitude of the upload acting on the intermediate portion of the wing is greater than a magnitude of the download acting on the strut outboard end portion of the strut. The preceding subject matter of this paragraph characterizes example 3 of the present disclosure, wherein example 3 also includes the subject matter according to example 2, above.

The strut outboard end portion of the strut is further configured such that, in a spanwise direction away from the body and when the aircraft is in flight, a magnitude of the download acting on the strut outboard end portion of the strut generated by the strut outboard end portion of the strut increases. The preceding subject matter of this paragraph characterizes example 4 of the present disclosure, wherein example 4 also includes the subject matter according to any one of examples 2 or 3, above.

The intermediate portion of the wing is further configured such that, in the spanwise direction away from the body and when the aircraft is in flight, a magnitude of the upload acting on the intermediate portion of the wing generated by the intermediate portion of the wing increases. The preceding subject matter of this paragraph characterizes example 5 of the present disclosure, wherein example 5 also includes the subject matter according to example 4, above.

The strut inboard end portion of the strut is configured to generate an upload acting on the strut inboard end portion of the strut when the aircraft is in flight. The preceding subject matter of this paragraph characterizes example 6 of the present disclosure, wherein example 6 also includes the subject matter according to any one of examples 1-5, above.

The strut outboard end portion of the strut is twisted relative to the strut inboard end portion of the strut. The preceding subject matter of this paragraph characterizes example 7 of the present disclosure, wherein example 7 also includes the subject matter according to any one of examples 1-6, above.

The strut outboard end portion of the strut is twisted to define a first negative angle of incidence relative to a longitudinal axis of the aircraft. The intermediate portion of the wing, defining a channel between the wing and the strut, is at a second negative angle of incidence relative to the longitudinal axis of the aircraft. The first negative angle of incidence is between about 50% and about 500% greater than the second negative angle of incidence of the intermediate portion of the wing. The preceding subject matter of this paragraph characterizes example 8 of the present disclosure, wherein example 8 also includes the subject matter according to example 7, above.

A maximum magnitude of the first negative angle of incidence is about 3-degrees. A maximum magnitude of the second negative angle of incidence is about 1-degree. The preceding subject matter of this paragraph characterizes example 9 of the present disclosure, wherein example 9 also includes the subject matter according to example 8, above.

In a spanwise direction away from the body a magnitude of the first negative angle of incidence of the strut outboard end portion of the strut increases at a first rate and then decreases at a second rate. The second rate is greater than the first rate. The preceding subject matter of this paragraph characterizes example 10 of the present disclosure, wherein example 10 also includes the subject matter according to any one of examples 7-9, above.

In the spanwise direction away from the body a magnitude of the second negative angle of incidence of the intermediate portion of the wing increases at a third rate. The third rate is less than the first rate and the second rate. The preceding subject matter of this paragraph characterizes example 11 of the present disclosure, wherein example 11 also includes the subject matter according to example 10, above.

The wing has a span-to-chord ratio of at least 20:1. The preceding subject matter of this paragraph characterizes example 12 of the present disclosure, wherein example 12 also includes the subject matter according to any one of examples 1-11, above.

The aircraft is configured for travel at transonic speeds. The preceding subject matter of this paragraph characterizes example 13 of the present disclosure, wherein example 13 also includes the subject matter according to any one of examples 1-12, above.

The intermediate portion of the wing defines a first thinned portion. An overall thickness of the first thinned portion of the wing decreases and increases in a spanwise direction along the wing away from the body. The strut outboard end portion of the strut defines a second thinned portion. The first thinned portion and the second thinned portion define an air flow channel between the first thinned portion and the second thinned portion. An overall thickness of the second thinned portion of the strut decreases and increases in a spanwise direction along the strut away from the body. The preceding subject matter of this paragraph characterizes example 14 of the present disclosure, wherein example 14 also includes the subject matter according to any one of examples 1-13, above.

Additionally disclosed herein is an aircraft that comprises a body, a wing, and a strut. The wing is coupled to and extends from the body. The wing comprises a wing inboard end portion, a wing outboard end portion, opposite the wing inboard end portion, and an intermediate portion between the wing inboard end portion and the wing outboard end portion. The strut comprises a strut inboard end portion and a strut outboard end portion. The strut inboard end portion is coupled to and extends from the body. The strut outboard end portion is coupled to and extends from the intermediate portion of the wing. The strut outboard end portion of the strut is twisted relative to the strut inboard end portion of the strut. The preceding subject matter of this paragraph characterizes example 15 of the present disclosure.

The strut outboard end portion of the strut is twisted to increase a negative angle of incidence, relative to a longitudinal axis of the aircraft, along the strut outboard end portion of the strut relative to the strut inboard end portion of the strut. The preceding subject matter of this paragraph characterizes example 16 of the present disclosure, wherein example 16 also includes the subject matter according to example 15, above.

The negative angle of incidence along the strut outboard end portion generates a download acting on the strut outboard end portion when the aircraft is in flight. The preceding subject matter of this paragraph characterizes example 17 of the present disclosure, wherein example 17 also includes the subject matter according to example 16, above.

The intermediate portion of the wing defines a first thinned portion. An overall thickness of the first thinned portion of the wing decreases and increases in a spanwise direction along the wing away from the body. The strut outboard end portion of the strut defines a second thinned portion. The first thinned portion and the second thinned portion define an air flow channel between the first thinned portion and the second thinned portion. An overall thickness of the second thinned portion of the strut decreases and increases in a spanwise direction along the strut away from the body. The preceding subject matter of this paragraph characterizes example 18 of the present disclosure, wherein example 18 also includes the subject matter according to any one of examples 15-17, above.

Further disclosed is a method of reducing drag on an aircraft. The aircraft comprises a body, a wing, and a strut extending from the body to an intermediate portion of the wing. The method comprises flying the aircraft at a transonic speed. The method also comprises generating an upload acting on the intermediate portion of the wing. The method further comprises generating a download acting on the strut at a location closer to the intermediate portion of the wing than the body. The preceding subject matter of this paragraph characterizes example 19 of the present disclosure.

The method further comprises increasing a first shockwave above the intermediate portion of the wing and decreasing a second shockwave between the intermediate portion of the wing and the strut. The preceding subject matter of this paragraph characterizes example 20 of the present disclosure, wherein example 20 also includes the subject matter according to example 19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which:

FIG. 6 is a cross-sectional side elevation view of the wing and the strut of the aircraft of FIG. 1, taken along the line 6-6 of FIG. 5, according to one or more examples of the present disclosure;

FIG. 7 is a cross-sectional side elevation view of the wing and the strut of the aircraft of FIG. 1, taken along the line 7-7 of FIG. 5, according to one or more examples of the present disclosure;

FIG. 8 is a cross-sectional side elevation view of the wing and the strut of the aircraft of FIG. 1, taken along the line 8-8 of FIG. 5, according to one or more examples of the present disclosure;

FIG. 9 is a cross-sectional side elevation view of the wing and the strut of the aircraft of FIG. 1, taken along the line 9-9 of FIG. 5, according to one or more examples of the present disclosure;

FIG. 16 is a cross-sectional side elevation view of the wing and the strut of the aircraft of FIG. 11, taken along the line 16-16 of FIG. 15, according to one or more examples of the present disclosure;

FIG. 17 is a cross-sectional side elevation view of the wing and the strut of the aircraft of FIG. 11, taken along the line 17-17 of FIG. 15, according to one or more examples of the present disclosure;

FIG. 18 is a cross-sectional side elevation view of the wing and the strut of the aircraft of FIG. 11, taken along the line 18-18 of FIG. 15, according to one or more examples of the present disclosure;

FIG. 19 is a cross-sectional side elevation view of the wing and the strut of the aircraft of FIG. 11, taken along the line 19-19 of FIG. 15, according to one or more examples of the present disclosure;

DETAILED DESCRIPTION

Figure 1:
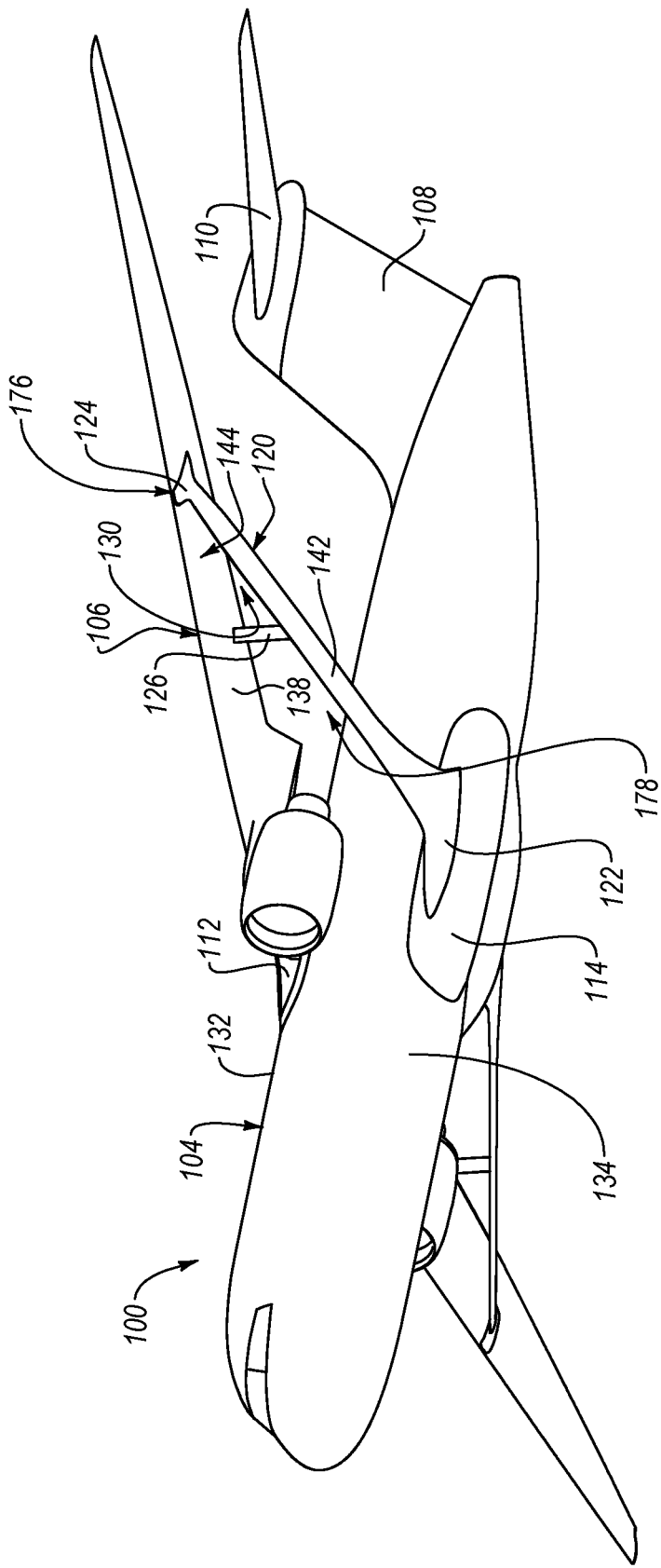
FIG. 1 is a perspective view of an aircraft, according to one or more examples of the present disclosure.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

The present disclosure provides an aircraft with a high aspect ratio wing braced by a strut. In some implementations, the aircraft is designed to travel at transonic speeds (e.g., free stream Mach number between about 0.7 and about 0.9) and support the commercial or military transportation of mass loads and/or mass passengers. The wing and/or the strut are specifically configured to reduce the strength of shockwaves around the wing and strut (e.g., above the wing, between the wing and strut, and below the strut) that may occur near the intersection of the wing and strut at transonic speeds. It is noted that for an aircraft traveling at transonic speeds, air flow over some of the surfaces of the aircraft (e.g., around leading edges and between the wing and strut) can reach sonic speeds (e.g., free stream Mach number of 1.0 or greater).

Referring to FIGS. 1-4, one embodiment of an aircraft 100 is shown. The aircraft 100 includes a body 104 (e.g., fuselage), a pair of wings 106 coupled to and extending from the body 104, a vertical stabilizer 108 coupled to and extending from the body 104, and a pair of horizontal stabilizers 110 coupled to and extending from the vertical stabilizer 108, or directly from the body 104 in some implementations. The aircraft 100 includes features representative of a commercial passenger, commercial transport, or military transport aircraft. The aircraft 100 also includes a pair of engines 102 operable to propel the aircraft 100 up to at least transonic speeds in some implementations. Accordingly, the features of the aircraft 100, including the body 104 and the wings 106 are configured to promote travel at transonic speeds. The engines 102 are attached to the wings 106, respectively, in the illustrated embodiment. However, in other embodiments, the engines 102 can be attached to other parts of the aircraft 100, such as the vertical stabilizer 108.

The wings 106 have a top surface 136 and a bottom surface 138, opposite the top surface 136. The top surface 136 and the bottom surface 138 define external surfaces of the wings 106. Each wing 106 is attached to the body 104 at a top portion 132 of the body 104 via a wing fairing 112. The wing fairing 112 is coupled to the top portion 132 of the body 104 and facilitates a secure attachment of the wings 106 to the body 104 with no adverse effects on the local flow field. Each wing 106 has a relatively high span-to-chord aspect ratio compared to general aviation aircraft. For example, in one implementation, each wing 106 has a span-to-chord aspect ratio greater than 10:1, and in another implementation, each wing 106 has a span-to-chord aspect ratio equal to or greater than 20:1.

Figure 4:
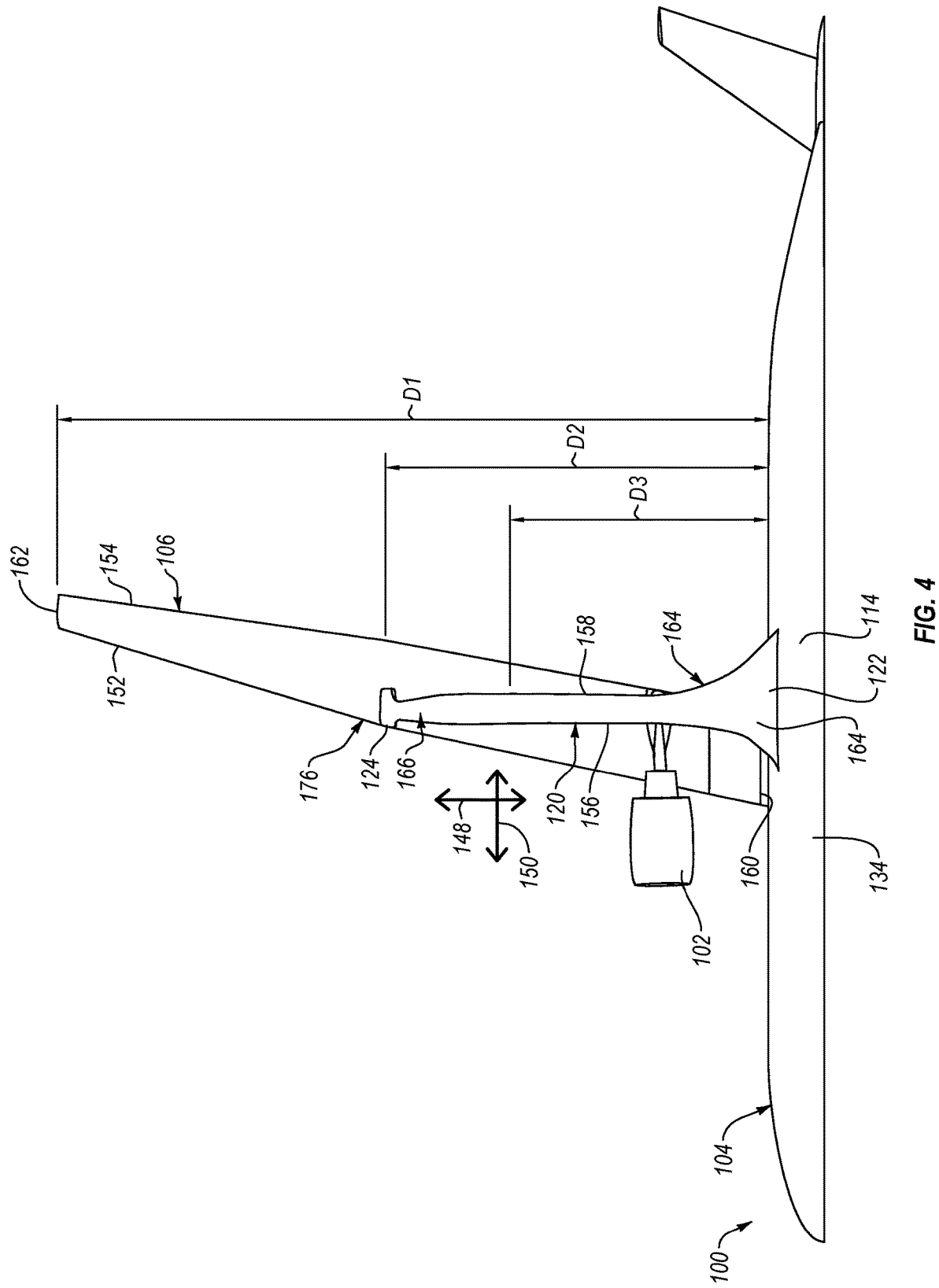
FIG. 4 is a bottom view of the aircraft of FIG. 1, according to one or more examples of the present disclosure.

Generally, as shown in FIG. 4, each wing 106 extends away from the wing fairing 112 in a spanwise direction 148 from a wing inboard end portion 160 to a wing outboard end portion 162, which includes a tip of the wing 106. The wing inboard end portion 160 is a fixed end portion and the wing outboard end portion 162 is a free end portion. Additionally, as also shown in FIG. 4 and into the page in FIG. 2, the chord of each wing 106 at a given location along the span of the wing 106 extends in a chordwise direction 150. Unless otherwise noted, as used herein, a direction identified in the figures by dual directional arrows effectively includes both directions or opposite directions along the identified path. Accordingly, for example, the spanwise direction 148 includes a body-to-wingtip direction along the path identified with dual directional arrows and labeled 148 and a wingtip-to-body direction along the same path.

Because of the high span-to-chord aspect ratio of the wings 106 and high loads placed on the wings 106, such as at transonic speeds, the wings 106 of the aircraft 100 form part of a strut-braced wing system of the aircraft 100, which includes a pair of struts 120 to brace the wings 106. Generally, the struts 120 are configured to act as a stiffening member to promote stiffening of the wings. Furthermore, the struts 120 help to transfer buckling loads away from the wing 106. Although in the illustrated embodiment, one strut 120 is associated with each wing 106, in other embodiments, additional struts, such as one or more jury struts 126 spanning the channel 178 between a wing 106 and a strut 120, can be associated with each wing 106.

The struts 120 have a top surface 140 and a bottom surface 142, opposite the top surface 140. The top surface 140 and the bottom surface 142 define external surfaces of the struts 120. Each strut 120 is attached to the body 104 at a bottom portion 134 of the body 104 via a body-strut fairing 122. Each body-strut fairing 122 facilitates a secure attachment of a respective one of the struts 120 to a landing gear fairing 114. The landing gear fairing 114 is coupled to the bottom portion 134 of the body 104 and is configured to house the landing gear of the aircraft 100. Each strut 120 has a relatively high span-to-chord aspect ratio.

Generally, as shown in FIG. 4, each strut 120 extends away from the body-strut fairing 122 in the spanwise direction 148 from a strut inboard end portion 164 to a strut outboard end portion 166. The strut inboard end portion 164 is a fixed end portion and the strut outboard end portion 166 also is a fixed end portion. The strut outboard end portion 166 is attached to a wing-strut fairing 124 that is coupled to the bottom surface 138 of the wing 106 at an intermediate portion 176 of the wing 106. Accordingly, each strut 120 is coupled to the intermediate portion 176 of a wing 106 via a respective wing-strut fairing 124. The intermediate portion 176 of each wing 106 is located between the wing inboard end portion 160 and the wing outboard end portion 162. Additionally, as also shown in FIG. 4 and into the page in FIG. 2, the chord of each strut 120 at a given location along the span of the strut 120 extends in the chordwise direction 150.

Figure 2:
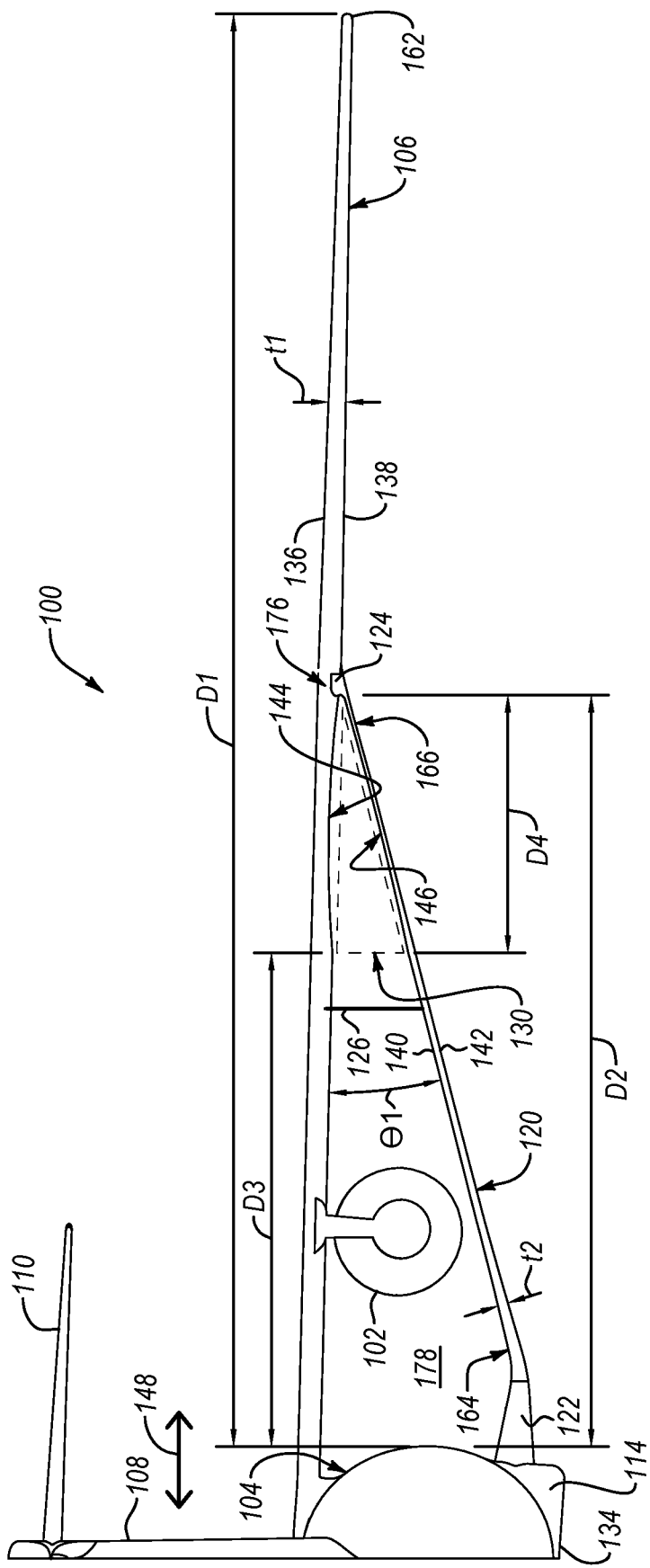
FIG. 2 is a rear view of the aircraft of FIG. 1, according to one or more examples of the present disclosure.
Figure 3:
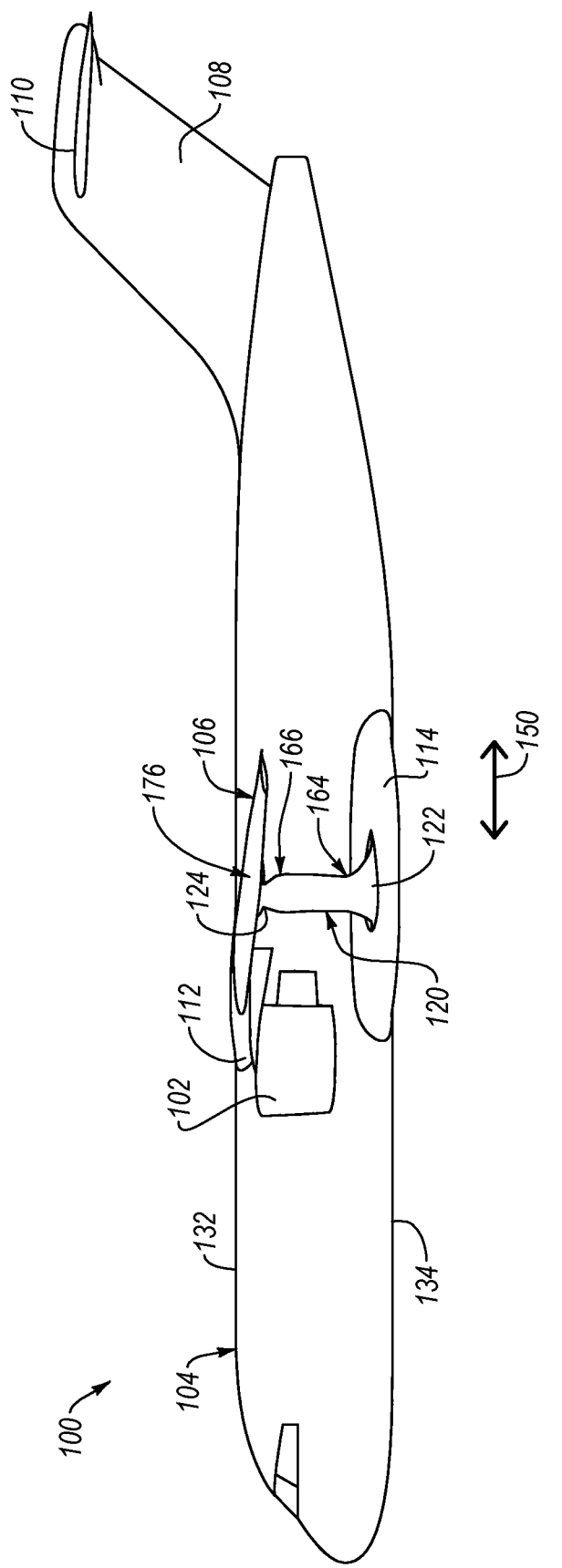
FIG. 3 is a side elevation view of the aircraft of FIG. 1, according to one or more examples of the present disclosure.

Referring now to FIG. 2, the strut 120 is angled upwardly at an angle θ1 relative to the wing 106. In other words, each strut 120 extends upwardly away from the bottom portion 134 of the body 104 at the angle θ1 relative to a respective one of the wings 106. In one implementation, the wings 106 extend away from the body 104 substantially along a horizontal plane with some amount of anhedral. However, in certain implementations, the wings 106 extend away from the body 104 with no anhedral or with some dihedral.

Referring to FIG. 4, each wing 106 extends to a first distance D1 away from the body 104 (e.g., away from a respective side of the body 104). Similarly, each strut 120 extends to a second distance D2 away from the body 104. Accordingly, the intermediate portion 176 of the wing 106 is located at the second distance D2 away from the body 104. In one embodiment, the second distance D2 is between about 40% and about 70% of the first distance D1. According to some implementations, the second distance D2 is between about 50% and about 60% of the first distance D1. In one particular implementation, the second distance D2 is about 58% of the first distance D1.

When viewed from a top or bottom view (see, e.g., FIG. 4), each wing 106 vertically overlaps a respective strut 120. Accordingly, a space or channel 178 is defined directly between the bottom surface 138 of the wing 106 and the top surface 140 of the strut 120 (see, e.g., FIG. 2). Air passes through the channels 178 between the wings 106 and the struts 120 when the aircraft 100 is in motion. At high speeds, such as transonic speeds, air can pass through the channels 178 between the wings 106 and the struts 120.

Although the channel 178 effectively converges in the spanwise direction 148 away from the body 104, because of the relatively large distance between the wing lower surface 138 and the strut upper surface 140, air passing through the majority of each channel 178 is less inclined to accelerate beyond the transonic regime to reach Mach 1 or greater relative to the air passing around the channel 178. However, air passing through a wing-strut channel 130 of the channel 178 proximate the intersection of a wing 106 and a strut 120 (e.g., adjacent the intermediate portion 176 of the wing 106) is inclined to accelerate to Mach 1 or greater due to the relatively smaller distance between the wing lower surface 138 and the strut upper surface 140 in the wing-strut channel 130 and the increased interaction between these surfaces. Substantial acceleration of air through the wing-strut channel 130, particularly when the aircraft 100 is traveling at transonic speeds, can cause a shockwave above the strut 120 and within the wing-strut channel 130. Shockwaves formed within the wing-strut channel 130 tend to increase interference drag on the associated wing 106 and strut 120. The wing-strut channel 130 initiates at a third distance D3 away from the body 104. Accordingly, the wing-strut channel 130 has a length equal to the difference between the second distance D2 and the third distance D3. In one implementation, the third distance D3 is greater than about 50% of the second distance D2. According to some implementations, the third distance D3 is between about 30% and about 60% (e.g., about 45%) of the first distance D1.

To promote a reduction in the strength of the shockwave generated within the wing-strut channel 130 and a corresponding reduction in the interference drag on the associated wing 106 and strut 120, each wing 106 includes a first thinned portion 144 formed in the intermediate portion 176 of the wing 106 and/or each strut 120 includes a second thinned portion 146 formed in the strut outboard end portion 166 of the strut 120. Whether alone or in combination, and depending on the relative proximity of the wing 106 to the strut 120 and area progression through the channel 130, the first thinned portion 144 and the second thinned portion 146 effectively increase the area of the wing-strut channel 130, which can result in a drop in the acceleration of air passing through the wing-strut channel 130 and thus a reduction in the shockwave and corresponding interference drag.

Each wing 106 has an overall thickness t1 defined as the maximum distance between the top surface 136 of the wing 106 and the bottom surface 138 of the wing 106 at any given location along the wing 106. Some conventional wings on aircraft with or without struts have an overall thickness that gradually reduces at a given rate in the spanwise direction from the body to the tip of the wing. In other words, a conventional wing, on an aircraft with or without struts, does not have a dramatic increase or change in the rate that the overall thickness of the wing decreases in the spanwise direction away from the body to the tip of the wing. Moreover, a conventional wing, on an aircraft with or without struts, does not have an increase in the overall thickness of the wing in the spanwise direction away from the body to the tip of the wing.

Figure 5:
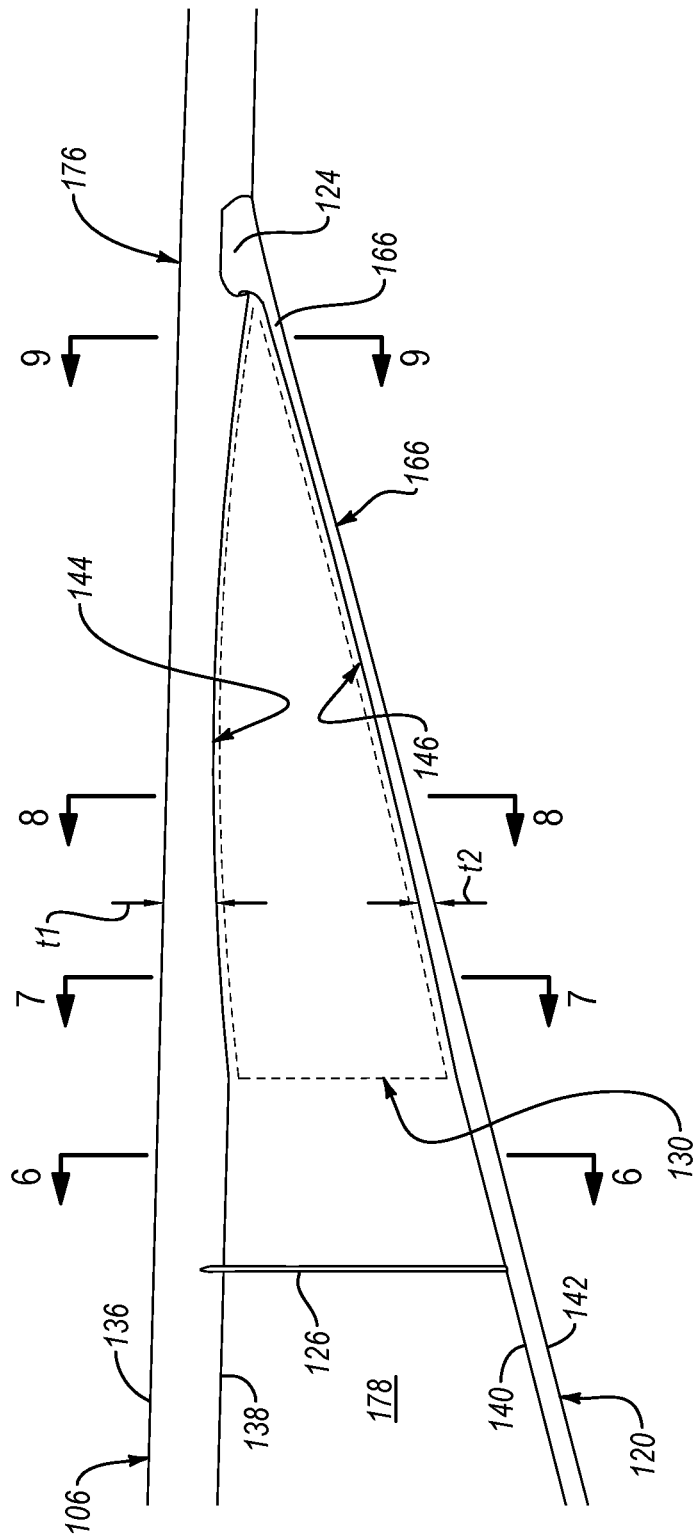
FIG. 5 is an enlarged rear view of a wing and a strut of the aircraft of FIG. 1, according to one or more examples of the present disclosure.
Figure 10:
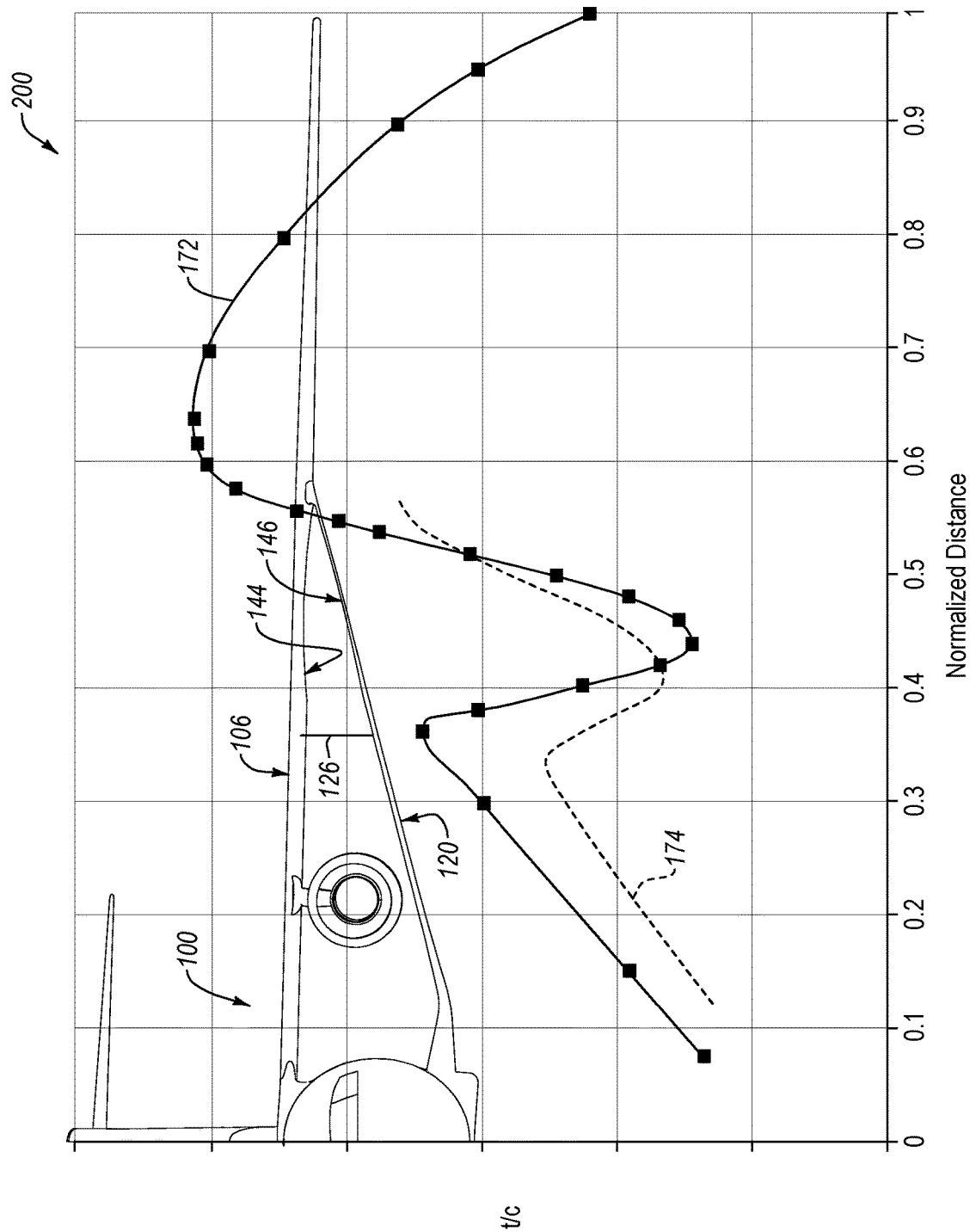
FIG. 10 is a chart comparing a thickness-to-chord ratio (t/c) of the wing and the strut of the aircraft of FIG. 1 compared to a normalized distance from a body of the aircraft, according to one or more examples of the present disclosure.
Figure 11:
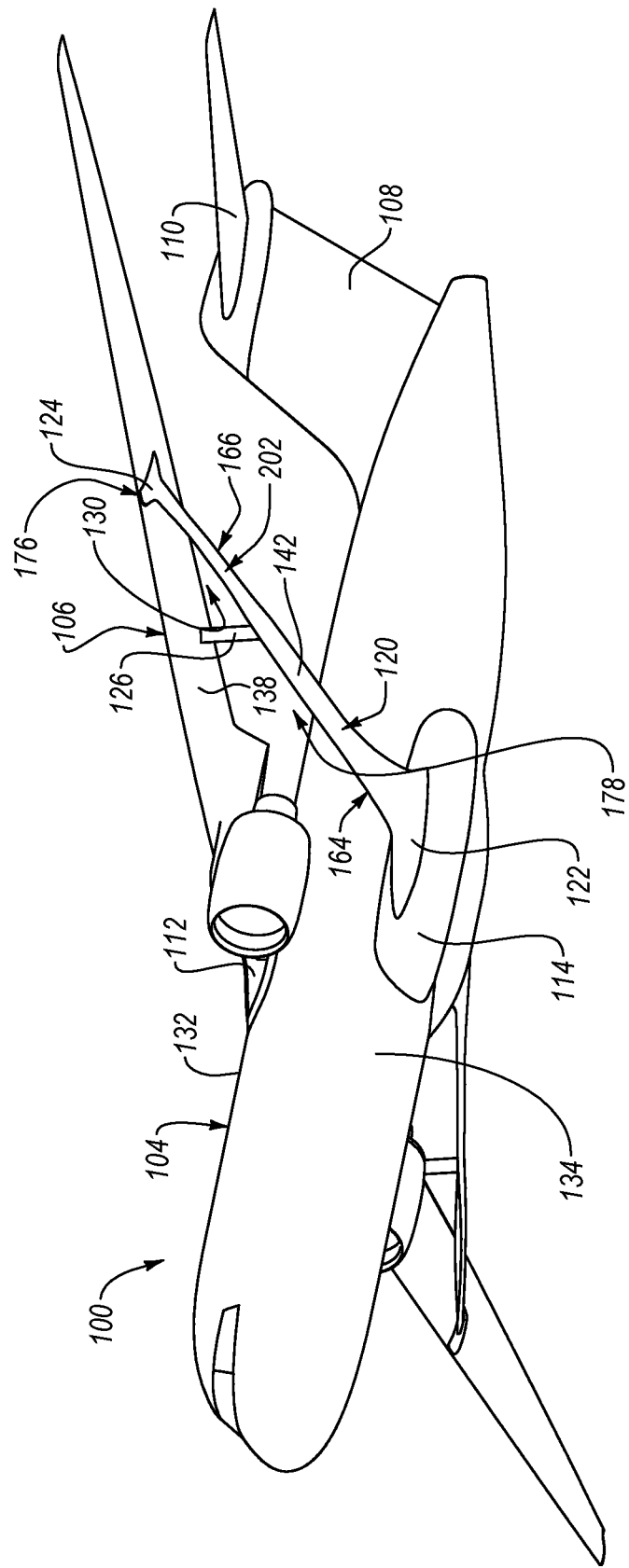
FIG. 11 is a perspective view of an aircraft, according to one or more examples of the present disclosure.
Figure 12:
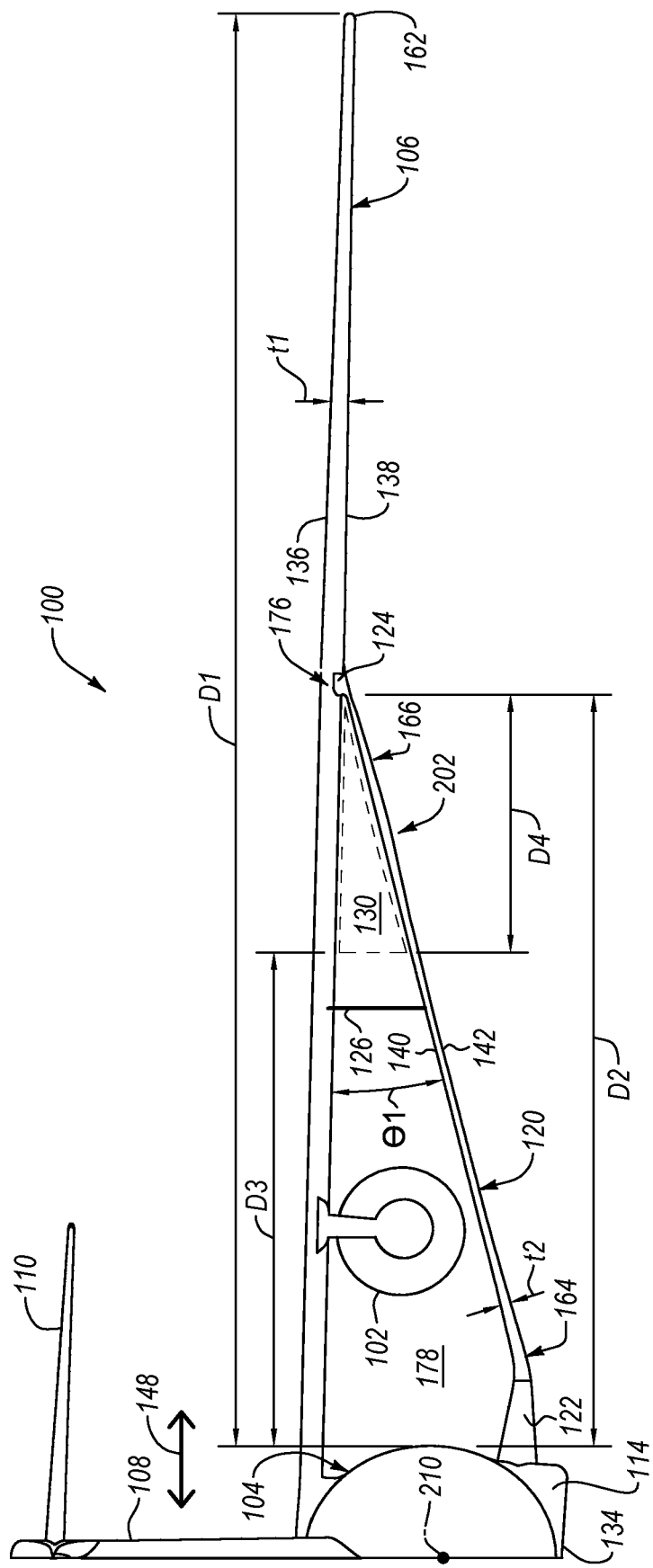
FIG. 12 is a rear view of the aircraft of FIG. 11, according to one or more examples of the present disclosure.
Figure 13:
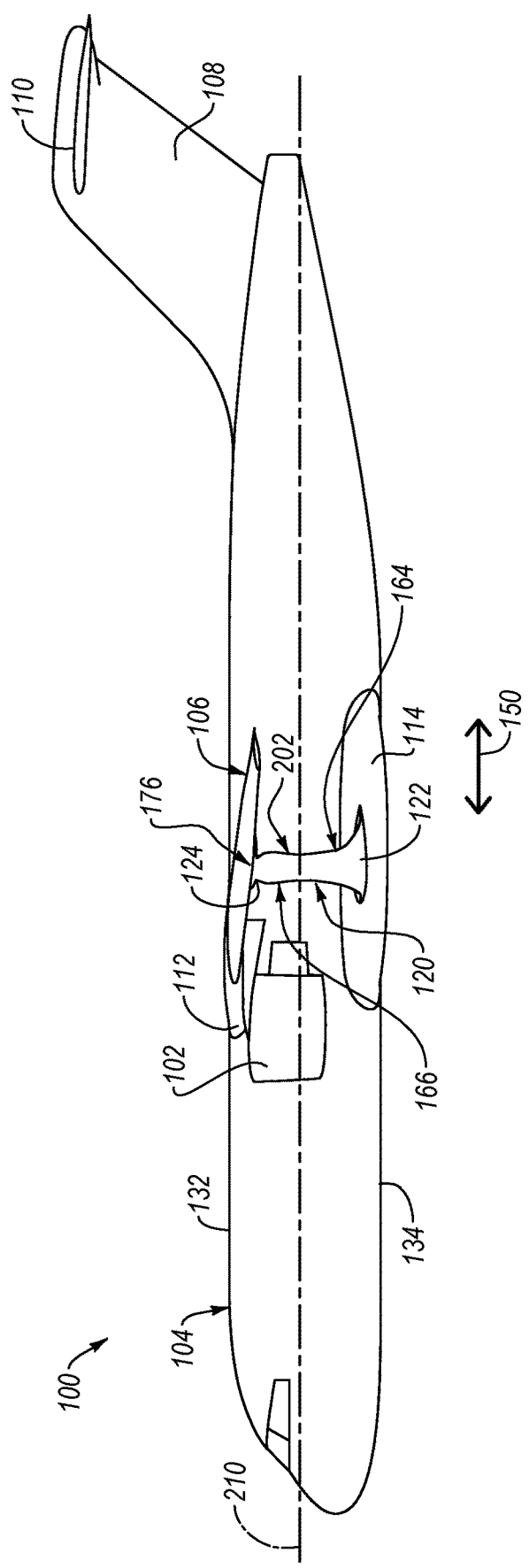
FIG. 13 is a side elevation view of the aircraft of FIG. 11, according to one or more examples of the present disclosure.
Figure 14:
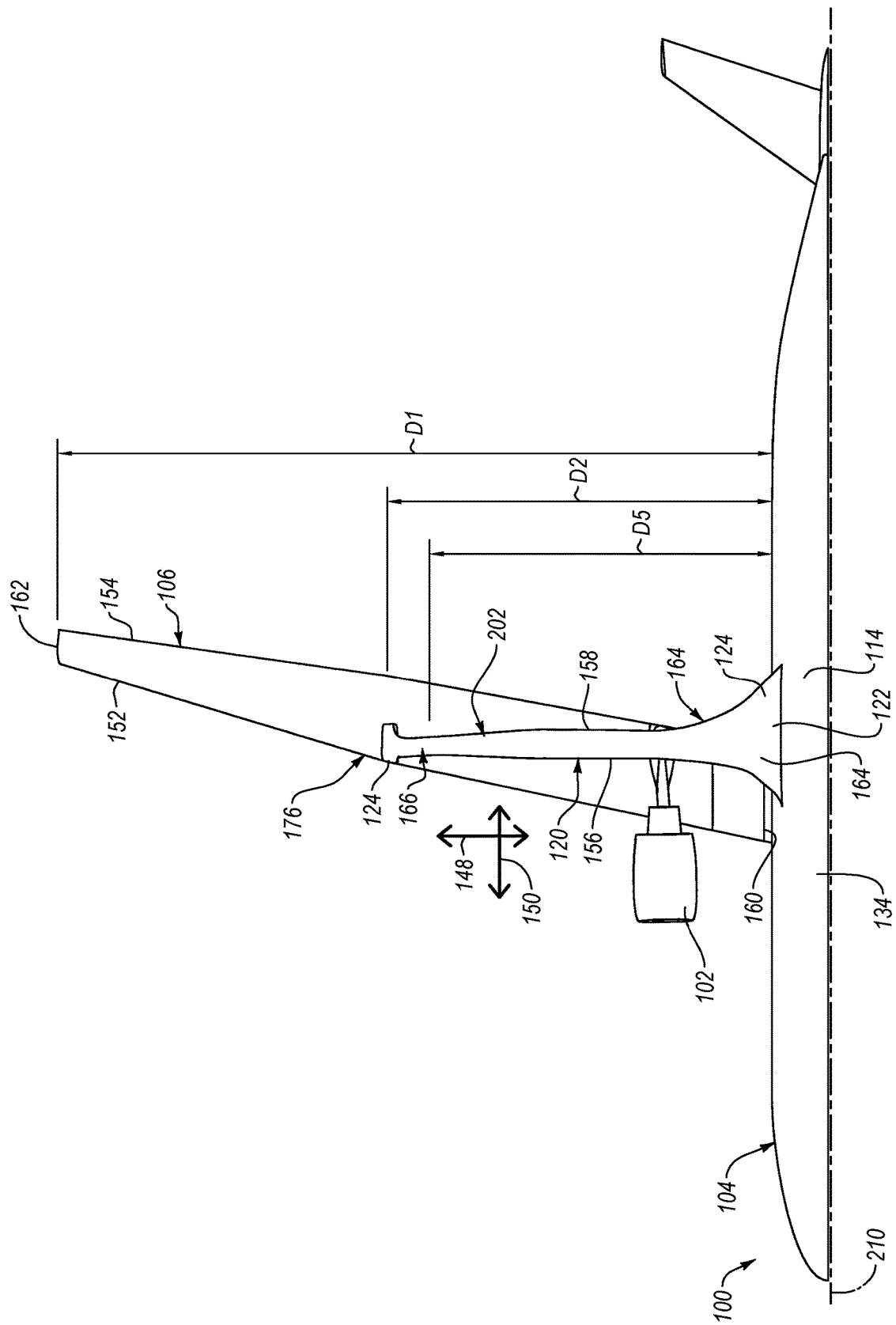
FIG. 14 is a bottom view of the aircraft of FIG. 11, according to one or more examples of the present disclosure.
Figure 15:
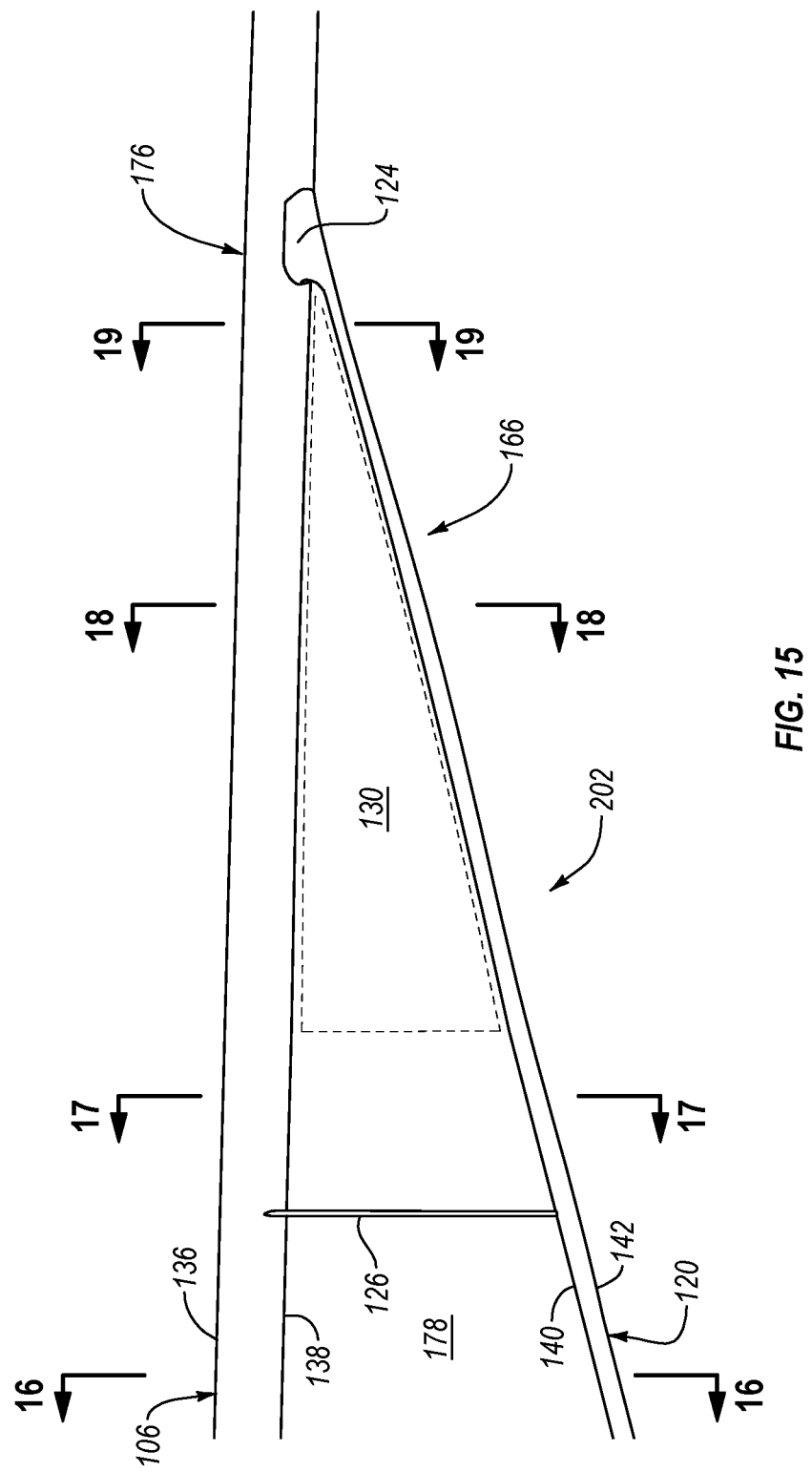
FIG. 15 is an enlarged rear view of a wing and a strut of the aircraft of FIG. 11, according to one or more examples of the present disclosure.

Referring to FIGS. 5 and 10, contrary to conventional wings on aircraft with struts, the first thinned portion 144 of each wing 106 has an overall thickness t1 that decreases and increases in the spanwise direction 148. In the spanwise direction 148 from the body 104 to the wingtip, the overall thickness t1 of the first thinned portion 144 drops at a rate greater than any rate of reduction of the overall thickness t1 of the wing between the body 104 and the first thinned portion 144. The rate of increase of the overall thickness t1 of the first thinned portion 144 in the spanwise direction 148 from the body 104 to the wingtip can be the same as or different than the rate of reduction of the overall thickness t1 of the first thinned portion 144 in the same direction. As shown by the wing thickness curve 172 of the chart 200 of FIG. 10, which shows one example of many possible examples of the wing thickness curve 172, a thickness-to-chord ratio (t/c) of the wing 106 compared to a normalized distance from the body 104 of the aircraft 100 experiences a dramatic drop at the start of the first thinned portion 144 and a subsequent dramatic increase up to the end of the first thinned portion 144.

The first thinned portion 144 is coextensive with the wing-strut channel 130. Accordingly, in the spanwise direction 148 away from the body 104, the first thinned portion 144 initiates at the third distance D3 away from the body 104 and terminates substantially at the second distance D2. The wing-strut channel 130 is bounded on top by the bottom surface 138 of the wing 106 at the first thinned portion 144 of the wing 106.

The configuration (e.g., shape) of the wing 106 can be defined in terms of the shape of the bottom surface 138 of the wing 106, which extends from a leading edge 152 of the wing 106 to a trailing edge 154 of the wing 106, along various planes. In the illustrated embodiment, a substantial portion (e.g., an entirety) of the bottom surface 138 of the wing 106 is curved (e.g., convex) along planes parallel to the chordwise direction 150 to define an airfoil shape. For example, as shown in FIG. 6, which is a cross-section of the wing 106 along a plane parallel to the chordwise direction 150 at a location between the first thinned portion 144 and the body 104, an entirety of the bottom surface 138 of the wing 106 is curved. Similarly, as shown in FIG. 9, which is a cross-section of the wing 106 along a plane parallel to the chordwise direction 150 at a location between, or just including, the first thinned portion 144 and the wing outboard end portion 162 of the wing 106, an entirety of the bottom surface 138 of the wing 106 is curved.

However, at least a portion of the bottom surface 138 of the wing 106 defining the first thinned portion 144 is flatter or less-curved along a plane parallel to the chordwise direction 150 than the rest of the bottom surface 138 of the wing 106. For example, as shown in FIGS. 7 and 8, which are cross-sections of the wing 106 along planes parallel to the chordwise direction 150 at two locations of the first thinned portion 144, at least a portion of the bottom surface 138 of the wing 106 defining the first thinned portion 144 is flatter or less-curved when viewed in the spanwise direction than the bottom surface 138 at the locations shown in FIGS. 6 and 9. The curvature of the bottom surface 138 of the wing 106 at the first thinned portion 144 varies in the spanwise direction 148. For example, the curvature of the bottom surface 138 of the wing 106 at the location shown in FIG. 7 is less than at the location shown in FIG. 6, but more than at the location shown in FIG. 8. As another example, the curvature of the bottom surface 138 of the wing 106 at the location shown in FIG. 8 is less than at the location shown in FIG. 7 and less than at the location shown in FIG. 9. As shown in FIGS. 6-9, in the spanwise direction 148 away from the body 104, the curvature of the bottom surface 138 of the wing 106 decreases from a high or maximum curvature (e.g., FIG. 6) to a low or minimum curvature (e.g., FIG. 8) and then increases back to a high or maximum curvature (e.g., FIG. 9). The drop in the curvature of the bottom surface 138 of the wing 106 effectuates the drop in the overall thickness t1 of the wing 106 at the first thinned portion 144.

Referring to FIG. 5, the configuration of the wing 106 can be defined in terms of the shape of the bottom surface 138 of the wing 106 along different planes compared to the planes in FIGS. 6-9. In some implementations, a substantial portion (e.g., an entirety) of the bottom surface 138 of the wing 106, exclusive of or not including the first thinned portion 144, is only slightly curved or locally substantially planar along a plane parallel to the spanwise direction 148. For example, as shown in FIGS. 2 and 5, the bottom surface 138 of the wing 106 between the first thinned portion 144 and the body 104 and between the first thinned portion 144 and the wingtip, along a plane parallel to the spanwise direction 148, has only a slight curvature (e.g., smaller than that along a plane parallel to the chordwise direction 150) or is locally substantially planar or flat. However, as also shown in FIGS. 2 and 5, at least a portion of the bottom surface 138 of the wing 106 at the first thinned portion 144 is more curved along the plane parallel to the spanwise direction 148. The curvature of the bottom surface 138 of the first thinned portion 144 of the wing 106 is curved (e.g., concave in some implementations) along the plane parallel to the spanwise direction 148. The curvature (e.g., concavity) of the bottom surface 138 of the first thinned portion 144 of the wing 106 effectuates the change in the overall thickness t1 of the wing 106 at the first thinned portion 144 in certain implementations.

Each strut 120 has an overall thickness t2 defined as the maximum distance between the top surface 140 of the strut 120 and the bottom surface 142 of the strut 120 at any given location along the strut 120. Some conventional struts on aircraft have an overall thickness that gradually reduces at a given rate in the spanwise direction from the body to the tip of the wing. In other words, some conventional struts do not have a dramatic increase or change in the rate that the overall thickness of the strut decreases in the spanwise direction away from the body. Moreover, some conventional struts do not have a change (whether an increase or decrease) in the overall thickness of the strut in the spanwise direction away from the body. Referring to FIG. 5, contrary to some conventional struts, the second thinned portion 146 of each strut 120 has an overall thickness t2 that decreases and increases in the spanwise direction 148. In the spanwise direction 148 away from the body 104, the overall thickness t2 of the second thinned portion 146 drops at a rate greater than any rate of reduction of the overall thickness t2 of the strut between the body 104 and the second thinned portion 146. The rate of increase of the overall thickness t2 of the second thinned portion 146 in the spanwise direction 148 away from the body 104 can be the same as or different than the rate of reduction of the overall thickness t2 of the second thinned portion 146 in the same direction. As shown by the strut thickness curve 174 of the chart 200 of FIG. 10, which shows one example of many possible examples of the strut thickness curve 174, a thickness-to-chord ratio (t/c) of the strut 120 compared to a normalized distance from the body 104 of the aircraft 100 experiences a dramatic drop at the start of the second thinned portion 146 and a subsequent dramatic increase up to the end of the second thinned portion 146.

The second thinned portion 146 is coextensive with the wing-strut channel 130. Accordingly, in the spanwise direction 148 away from the body 104, the second thinned portion 146 initiates at the third distance D3 away from the body 104 and terminates substantially at the second distance D2. The wing-strut channel 130 is bounded on bottom by the top surface 140 of the strut 120 at the second thinned portion 146 of the strut 120.

The configuration (e.g., shape) of the strut 120 can be defined in terms of the shape of the top surface 140 of the strut 120, which extends from a leading edge 156 of the strut 120 to a trailing edge 158 of the strut 120, along various planes. In the illustrated embodiment, a substantial portion (e.g., an entirety) of the top surface 140 of the strut 120 is curved (e.g., convex) along planes parallel to the chordwise direction 150 to define an airfoil shape. For example, as shown in FIG. 6, which is a cross-section of the strut 120 along a plane parallel to the chordwise direction 150 at a location between the second thinned portion 146 and the body 104, an entirety of the top surface 140 of the strut 120 is curved. Similarly, as shown in FIG. 9, which is a cross-section of the strut 120 along a plane parallel to the chordwise direction 150 at a location between, or just including, the second thinned portion 146 and the wing outboard end portion 162 of the wing 106, an entirety of the top surface 140 of the strut 120 is curved.

However, at least a portion of the top surface 140 of the strut 120 defining the second thinned portion 146 is flatter or less-curved along a plane parallel to the chordwise direction 150 than the rest of the top surface 140 of the strut 120. For example, as shown in FIGS. 7 and 8, which are cross-sections of the strut 120 along planes parallel to the chordwise direction 150 at two locations of the second thinned portion 146, at least a portion of the top surface 140 of the strut 120 defining the second thinned portion 146 is flatter or less-curved \ when viewed in the spanwise direction than the top surface 140 at the locations shown in FIGS. 6 and 9. The curvature of the top surface 140 of the strut 120 at the second thinned portion 146 varies in the spanwise direction 148. For example, the curvature of the top surface 140 of the strut 120 at the location shown in FIG. 7 is less than at the location shown in FIG. 6, but more than at the location shown in FIG. 8. As another example, the curvature of the top surface 140 of the strut 120 at the location shown in FIG. 8 is less than at the location shown in FIG. 7 and less than at the location shown in FIG. 9. As shown in FIGS. 6-9, in the spanwise direction 148 away from the body 104, the curvature of the top surface 140 of the strut 120 decreases from a high or maximum curvature (e.g., FIG. 6) to a low or minimum curvature (e.g., FIG. 8) and then increases back to a high or maximum curvature (e.g., FIG. 9). The drop in the curvature of the top surface 140 of the strut 120 effectuates the drop in the overall thickness t2 of the strut 120 at the second thinned portion 146.

Referring to FIG. 5, the configuration of the strut 120 can be defined in terms of the shape of the top surface 140 of the strut 120 along different planes compared to the planes in FIGS. 6-9. In some implementations, a substantial portion (e.g., an entirety) of the top surface 140 of the strut 120, exclusive of or not including the second thinned portion 146, is only slightly curved or locally substantially planar along a plane parallel to the spanwise direction 148. For example, as shown in FIGS. 2 and 5, the top surface 140 of the strut 120 between the second thinned portion 146 and the body 104 and between the second thinned portion 146 and the intermediate portion 176 of the wing 106, along a plane parallel to the spanwise direction 148, has only a slight curvature (e.g., smaller than that along a plane parallel to the chordwise direction 150) or is locally substantially planar or flat. However, as also shown in FIGS. 2 and 5, at least a portion of the top surface 140 of the strut 120 at the second thinned portion 146 is more curved along the plane parallel to the spanwise direction 148. The curvature of the top surface 140 of the second thinned portion 146 of the strut 120 is curved (e.g., concave in some implementations) along the plane parallel to the spanwise direction 148. The curvature (e.g., concavity) of the top surface 140 of the second thinned portion 146 of the strut 120 effectuates the change in the overall thickness t2 of the strut 120 at the second thinned portion 146 in some implementations.

Referring again to FIG. 5, the bottom surface 138 of the first thinned portion 144 of the wing 106 faces the top surface 140 of the second thinned portion 146 of the strut 120 to define the air flow channel 130 between the bottom surface 138 of the first thinned portion 144 and the top surface 140 of the second thinned portion 146. As presented above, compared to conventional aircraft with wing-struts, the first thinned portion 144 and/or the second thinned portion 146 act to reduce shockwaves between the strut and wing (which shockwaves can increase an interference drag on an aircraft) by increasing the cross-sectional area between the strut and wing and reducing the acceleration of air through the area between the strut and wing, particularly when the aircraft is traveling at transonic speeds.

In some implementations, the first thinned portion 144 and the second thinned portion 146 act to change camber of the wing 106 and strut 120, respectively, relative to contiguous portions of the wing 106 and strut 120. For example, in one implementation where the top surface 136 of the wing 106 and the bottom surface 142 of the strut 120 at the air flow channel 130 is unchanged, the first thinned portion 144 of the wing 106 increases the camber of the wing 106 defining the air flow channel 130, and the second thinned portion 146 of the strut 120 decreases the camber of the strut 120 defining the air flow channel 130. However, in other implementations, the first thinned portion 144 and/or the second thinned portion 146 does not change the camber of the wing 106 and strut 120, respectively, relative to contiguous portions of the wing and strut 120. For example, where the top surface 136 of the wing 106 and the bottom surface 142 of the strut 120 at the air flow channel 130 are changed along with the bottom surface 138 of the wing 106 and the top surface 140 of the strut 120, the camber of the wing 106 and the strut 120 defining the air flow channel 130 can remain the same relative to contiguous portions of wing 106 and the strut 120.

The body 104, wing 106, and/or strut 120 is made from a fiber-reinforced polymer (e.g., carbon-fiber-reinforced polymer and glass-fiber-reinforced polymer), a metal, or a combination of a fiber-reinforced polymer and metal in some implementations.

Referring to FIGS. 11-14, an embodiment of an aircraft 100 is shown. The aircraft 100 in FIGS. 11-14 includes features similar to the features of the aircraft 100 in FIGS. 1-4, with like numbers referring to like features. Generally, the aircraft 100 of FIGS. 11-14 includes the same features as the aircraft 100 of FIGS. 1-4, except as otherwise noted. For example, in contrast to the aircraft 100 of FIGS. 1-4, the strut 120 of the aircraft 100 of FIGS. 11-14 includes a download-inducing portion 202 at a location away from the body 104.

For example, the download-inducing portion 202 is formed in the strut outboard end portion 166 of the strut 120 in one embodiment.

The download-inducing portion 202 of the strut 120 promotes a reduction in the strength of the shockwave generated within the wing-strut channel 130 and a corresponding reduction in the interference drag on the associated wing 106 and strut 120. More specifically, at transonic speeds of the aircraft 100, the download-inducing portion 202 of the strut 120 generates a download acting on the strut 120 within the wing-strut channel 130, which reduces shock strength (associated with a shockwave) within the wing-strut channel 130 and corresponding interference drag. While reducing shock strength within the wing-strut channel 130, strut twist variations may induce an increase in shock strength above the wing 106 and below the strut 120, opposite the wing-strut channel 130. However, the increased strength of these shockwaves is cumulatively less than the drop in the shock strength within the wing-strut channel 130 such that an overall weakened wing-strut shock system results in reduced interference drag impacting the wing-strut assembly.

Because the first thinned portion 144 of the wing 106, the second thinned portion 146 of the strut 120, and the download-inducing portion 202 of the strut 120 are configured to provide a reduction in shock strength within the wing-strut channel 130, in some implementations, the aircraft 100 includes the first thinned portion 144 and/or the second thinned portion 146, as well as the download-inducing portion 202. In certain implementations, the first thinned portion 144 and/or the second thinned portion 146 together with the download-inducing portion 202 cooperatively reduce the strength of the shockwave generated within the wing-strut channel 130 more than the first and/or second thinned portions 144, 146 and the download-inducing portion 202 alone. In a first example, in one implementation, the wing 106 of the aircraft 100 includes the first thinned portion 144, the strut 120 of the aircraft 100 includes the second thinned portion 144, and the strut 120 of the aircraft 100 includes the download-inducing portion 202. In a second example, the wing 106 of the aircraft 100 does not include the first thinned portion 144, the strut 120 of the aircraft 100 includes the second thinned portion 144, and the strut 120 of the aircraft 100 includes the download-inducing portion 202. In the first and second examples, the second thinned portion 144 of the strut 120 can be twisted to form at least a part of the download-inducing portion 202. In other words, the strut outboard end portion 166 can define both the second thinned portion 144 and the download-inducing portion 202. According to a third example, the wing 106 of the aircraft 100 includes the first thinned portion 144, the strut 120 of the aircraft 100 does not include the second thinned portion 144, and the strut 120 of the aircraft 100 includes the download-inducing portion 202.

According to one embodiment, for example, the download-inducing portion 202 of the strut 120 is defined as a portion of the strut 120 having a rate of change of an angle of incidence, in the spanwise direction away from the body, that is greater than a rate of change of an angle of incidence, in the spanwise direction away from the body, of the wing 106 at the same normalized distances away from the body 104. Accordingly, although the wing 106 and/or the strut 120 may have some nominal twisting in the spanwise direction, in some implementations, the download-inducing portion 202 of the strut 120 is defined as the portion of the strut 120 where the magnitude of twist diverges from that of the wing 106. For example, referring to the chart 250 of FIG. 20 and in the spanwise direction away from the body 104, the download-inducing portion 202 of the strut 120 begins at a normalized distance of about 0.25 and ends at a normalized distance of about 0.55 (or at the wing-strut fairing 124).

As illustrated in FIGS. 16-19, the twist of the wing 106 and the strut 120 is defined in terms of the angle θ2 of the wing chordline 212 and the angle θ3 of the strut chordline 214, respectively, relative to a longitudinal axis 210 (e.g., root or body axis) of the aircraft 100. The angle θ2 of the wing chordline 212 and the angle θ3 of the strut chordline 214, respectively, relative to a longitudinal axis 210 of the aircraft 100 is otherwise known as the angle of incidence of the wing 106 and the strut 120, respectively. A chordline is defined as a hypothetical straight line from the leading edge of the wing 106 or strut 120 to the trailing edge of the wing 106 or strut 120, respectively. The longitudinal axis 210 can be defined as a central axis of the body 104.

As shown in FIGS. 16-19 and 20, the angle of incidence θ2 of the wing 106 and the angle of incidence θ3 of the strut 120 are negative along substantially the entire span of the wing 106 and the strut 120. An angle of incidence that is negative can be expressed herein as a negative angle of incidence. The more negative an angle of incidence (or the larger the negative angle of incidence), the greater the magnitude of the negative angle of incidence. For example, as an angle of incidence becomes more negative, the magnitude of the angle of incidence becomes greater. Moreover, a negative slope (or negative rate of change) of the angles of incidence θ2, θ3 indicate an increase in the negative angle of incidence, and a positive slope (or positive rate of change) of the angles of incidence θ2, θ3 indicate a decrease in the negative angle of incidence.

Figure 20:
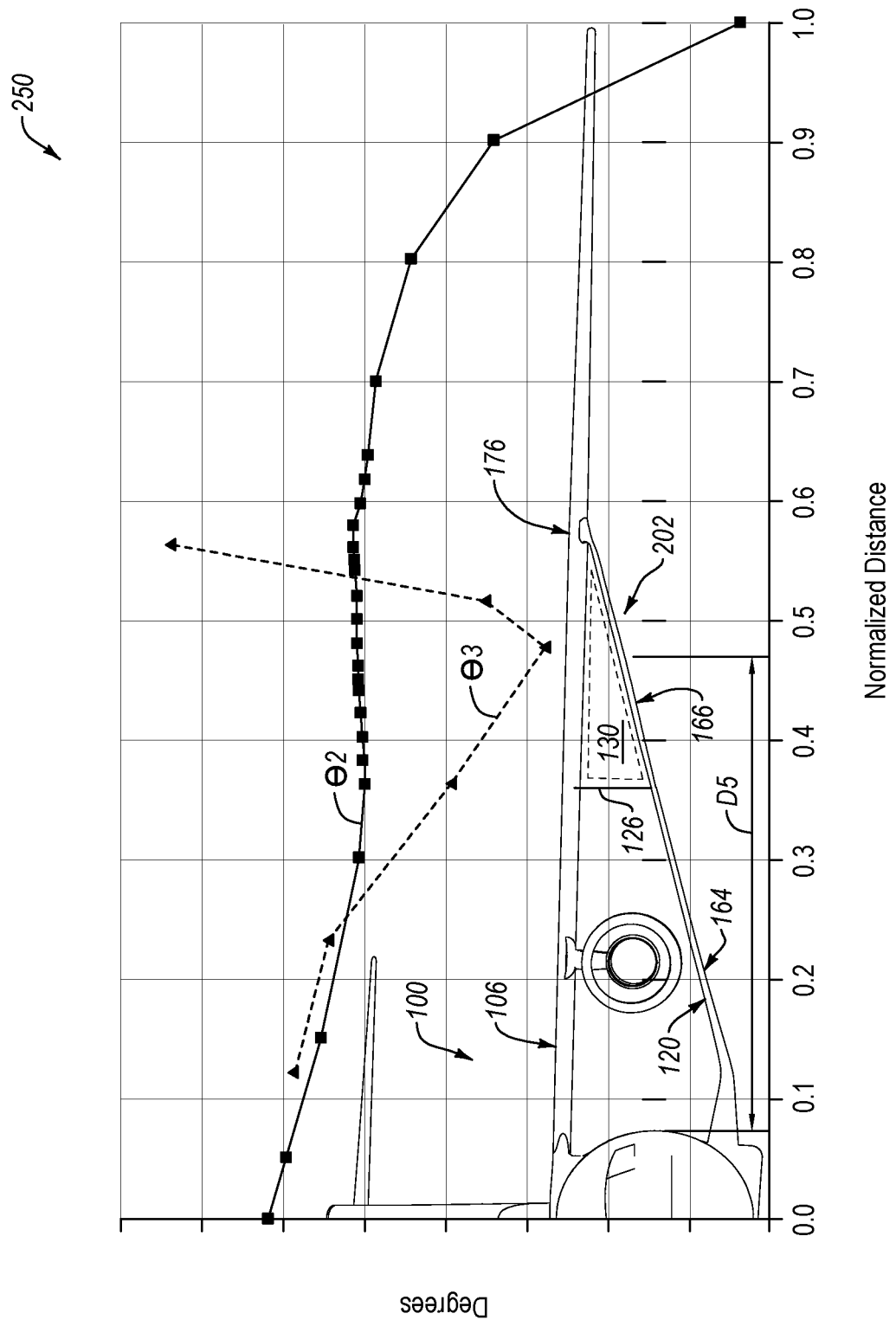
FIG. 20 is a chart comparing a twist of the wing and the strut of the aircraft of FIG. 11 compared to a normalized distance from a body of the aircraft, according to one or more examples of the present disclosure.

As shown in FIG. 20, in the spanwise direction away from the body 104, the negative angle of incidence θ2 increases in magnitude (e.g., the angle of incidence θ2 of the wing 106 becomes more negative) up to about the wing-strut channel 130 when the negative angle of incidence θ2 decreases in magnitude (e.g., angle of incidence θ2 becomes less negative). In the spanwise direction away from the body 104, the negative angle of incidence θ2 continuously becomes smaller along substantially the entire span of the wing-strut channel 130. Referring again to FIG. 20, a maximum magnitude of the negative angle of incidence θ2 of the wing 106 defining the channel 178 is about 1-degree. However, from the wing-strut channel 130 to the tip of the wing 106, the negative angle of incidence θ2 continuously becomes greater such that outboard of the channel 178 the negative angle of incidence θ2 becomes greater than 1-degree.

Similar to the wing 106, as shown in FIG. 20, in the spanwise direction away from the body 104, the negative angle of incidence θ3 increases in magnitude (e.g., the angle of incidence θ3 of the strut 120 becomes more negative) up to a fifth distance D5 away from the body 104 within the wing-strut channel 130 at which point the negative angle of incidence θ3 decreases in magnitude (e.g., the angle of incidence θ3 becomes less negative). From the fifth distance D5 in the spanwise direction away from the body 104, the negative angle of incidence θ3 of the strut 120 continuously decreases along the remaining span of the wing-strut channel 130 until the strut 120 terminates at the wing-strut fairing 124. In fact, the angle of incidence θ3 of the strut may become a positive angle of incidence within the wing-strut channel 130 before terminating at the wing-strut fairing 124. At the fifth distance D5, the magnitude of the negative angle of incidence θ3 is at a maximum. According to one embodiment, at the fifth distance D5, the negative angle of incidence θ3 of the strut 120 is about 3-degrees. In contrast, at the fifth distance D5, negative angle of incidence θ2 of the wing 106 is about 0.9-degrees. In some embodiments, within the download-inducing portion 202 of the strut 120, the negative angle of incidence θ3 of the strut 120 is between about 50% and about 500% greater than the negative angle of incidence θ2 of the wing 106. In one particular embodiment, the negative angle of incidence θ3 of the strut 120 is about 300% greater than the negative angle of incidence θ2 of the wing 106.

The download-inducing portion 202 of the strut 120 is marked by a substantial increase in the twisting of the strut 120 relative to the inboard portion of the strut 120 and the wing 106. The increased twisting of the strut 120 results in an increase in the rate at which the negative angle of incidence θ3 of the strut 120 increases relative to the inboard portion of the strut 120 and the wing 106. In the spanwise direction away from the body 104, the magnitude of the negative angle of incidence θ3 of the strut 120 increases at a first rate up to the fifth distance D5 and then decreases at a second rate up to the wing-strut fairing 124. Accordingly, within the wing-strut channel 130, the magnitude of the negative angle of incidence θ3 of the strut 120 increases at the first rate and decreases at the second rate. In some implementations, the second rate is greater than the first rate. In contrast, within the wing-strut channel 130 and in the spanwise direction away from the body 104, the magnitude of the negative angle of incidence θ2 of the wing 106 decreases at a third rate up to the end of the wing-strut channel 130. In some implementations, the third rate is less than the first rate and the second rate.

Referring to FIGS. 16-19, the negative angle of incidence θ2 of the wing 106 and the negative angle of incidence θ3 of the strut 120 are shown at various locations spanwise away from the body 104. As shown in FIG. 16, at a distance inboard of the wing-strut channel 130 and within the download-inducing portion 202 of the strut 120, the negative angle of incidence θ2 of the wing 106 is less than the negative angle of incidence θ3 of the strut 120. At a distance further outboard, as shown in FIG. 17, the negative angle of incidence θ2 of the wing 106 is about the same as that in FIG. 16, but the negative angle of incidence θ3 of the strut 120 is greater than that in FIG. 16. Furthermore, at the fifth distance D5 from the body 104, as represented in FIG. 17, the negative angle of incidence θ2 of the wing 106 is less than that in FIG. 17, but the negative angle of incidence θ3 of the strut 120 is greater than that in FIG. 17. Finally, as shown in FIG. 19, at a distance outboard of the fifth distance D5 and near an outboard end of the wing-strut channel 130, the negative angle of incidence θ2 of the wing 106 is less than that in FIG. 18, and the negative angle of incidence θ3 of the strut 120 is also less than that in FIG. 18.

Figure 21:
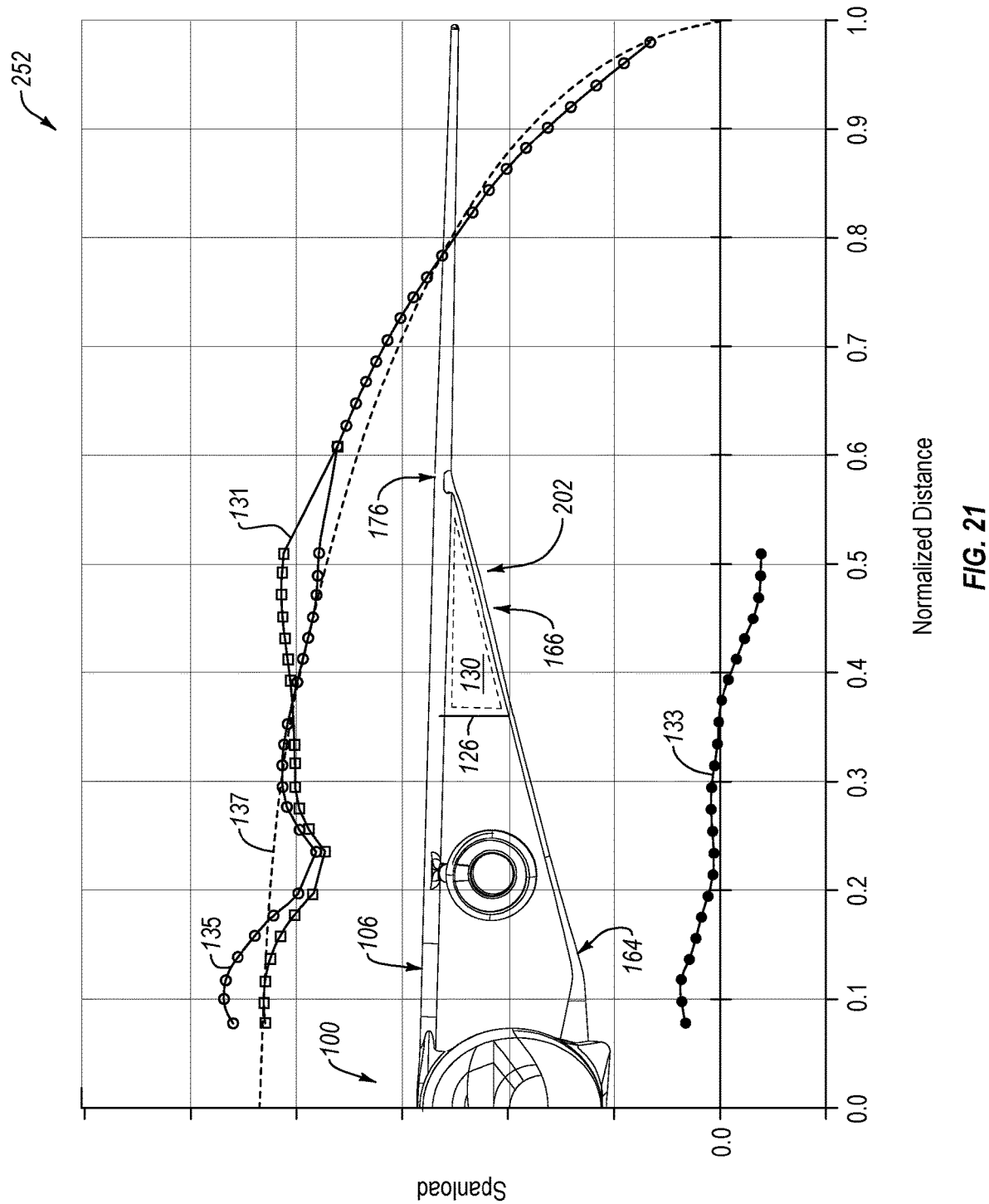
FIG. 21 is a chart comparing a spanload acting on the wing, strut, combined wing and strut, and optimized combined wing and strut of the aircraft of FIG. 11 versus a normalized distance from a body of the aircraft, according to one or more examples of the present disclosure.

The angle of incidence of the wing 106 and the strut 120 affects the spanload on the wing 106 and/or the strut 120, which cumulatively define the overall spanload acting on the wing-strut assembly. During flight of the aircraft 100, air flow passing over and under the wing 106 generates either an upload or download acting on the wing depending, at least in part, on the angle of incidence of the wing 106 and the angle of the longitudinal axis 210 relative to ground. As shown in the chart 252 of FIG. 21, assuming the longitudinal axis 210 is at an angle of approximately 2-degrees relative to ground and the aircraft 100 is traveling at transonic speeds, the negative angle of incidence θ2 of the wing 106 generates an upload acting on the wing 106. Similarly, during flight of the aircraft 100, air flow passing over and under the strut 120 generates either an upload or download acting on the strut depending, at least in part, on the angle of incidence of the strut 120 and the angle of the longitudinal axis 210 relative to ground. As shown in FIG. 21, assuming the longitudinal axis 210 is parallel to ground and the aircraft 100 is traveling at transonic speeds, the negative angle of incidence θ3 of the strut 120 generates an upload (positive y-axis) on the strut 120 between the body 104 of the aircraft 100 and the wing-strut channel 130 and generates a download (negative y-axis) on the strut 120 within the wing-strut channel 130.

The download acting on the strut 120 within the wing-strut channel 130 acts to lower or weaken the shock in the wing-strut channel 130. Because of the increased negative angle of incidence θ3 of the strut 120 along the download-inducing portion 202 of the strut 120, the bottom surface 142 of the strut 120 defines a suction side of the strut 120. In some implementations, due to the acceleration of air over the bottom surface 142, a shock forms on the strut 120 primarily or exclusively on the bottom surface 142. Accordingly, more air that would otherwise pass through the wing-strut channel 130 is diverted down and below the strut 120 when the bottom surface 142 defines the suction side of the strut 120, which results in a weakened shock in the wing-strut channel 130. As previously presented, the lower strength of the shock reduces the interference drag on the wing 106 and the strut 120 from air passing through the wing-strut channel 130.

Referring to FIG. 21, and again assuming the longitudinal axis 210 is at an angle of approximately 2-degrees relative to ground and the aircraft 100 is traveling at transonic speeds, an optimal spanload distribution 137 for the combined wing 106 and strut 120 (e.g., wing-strut assembly) is shown. The optimal spanload distribution 137 has a generally elliptical shape and is associated with a minimal induced drag on the aircraft 100. To promote an actual spanload distribution 135 for the combined wing 106 and strut 120 that resembles or follows the optimal spanload distribution 137, the reduction of the negative incidence angle θ2 of the wing 106 along the wing-strut channel 130 (see, e.g., distribution 131) generates an increase in the upload acting on the wing 106 along the wing-strut channel 130. The increase in the upload acting on the wing 106 along the wing-strut channel 130 counters the download acting on the strut 120 along the wing-strut channel 130 (see, e.g., distribution 133) such that the actual spanload distribution 135 more closely resembles the elliptical shape of the optimal spanload distribution 137. The increase in upload acting on the wing 106 along the wing-strut channel 130 increases the strength of the shockwave above the wing 106 along the wing-strut channel 130. Similarly, the decrease in download acting on the strut 120 along the wing-strut channel 130 increases the strength of the shockwave below the strut 120 along the wing-strut channel 130. However, the increase in the strength of the shockwave on the top surface 136 of the wing 106 is balanced against a reduction in induced drag, which is promoted by achieving an actual spanload distribution 135 that resembles the optimal spanload distribution 137. Furthermore, the increase in the strength of the shockwave on the bottom surface 142 of the strut 120 is balanced against a reduction in the strength of the shockwave in the wing-strut channel 130.

Figure 22:
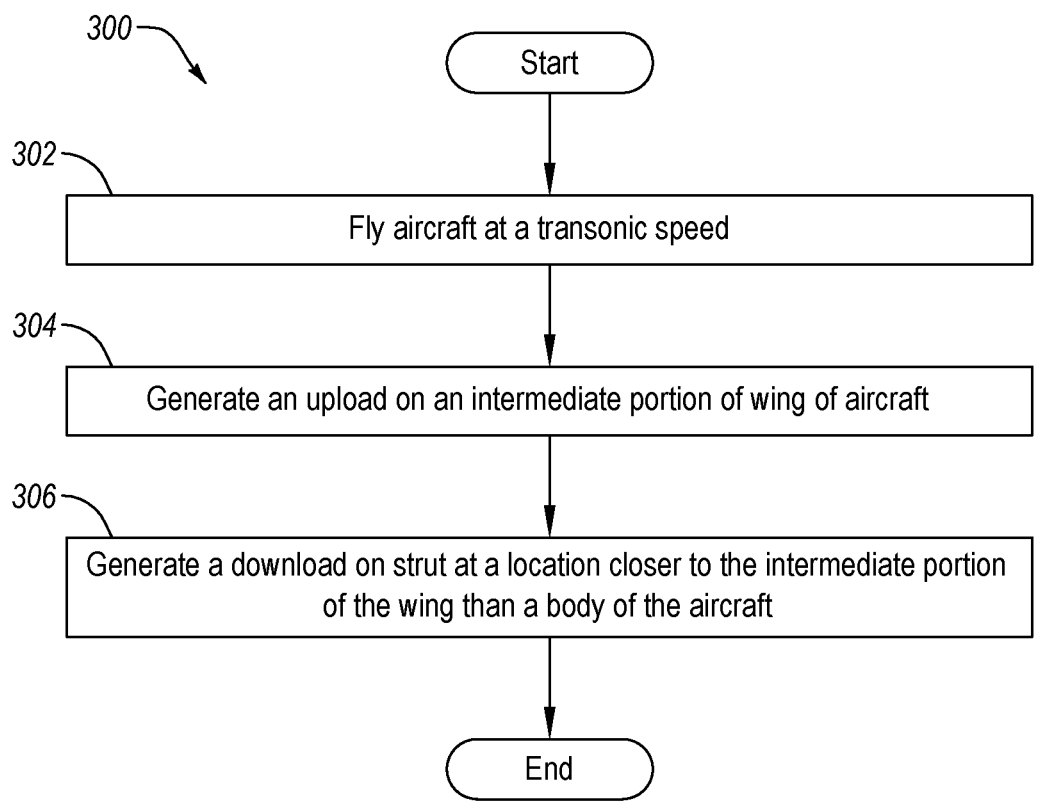
FIG. 22 is a method of reducing drag on an aircraft, according to one or more examples of the present disclosure.

Referring to FIG. 22, a method 300 of reducing drag on an aircraft comprising a body, a wing, and a strut extending from the body to an intermediate portion of the wing is shown. The aircraft can be the aircraft 100 as described above. The method 300 includes flying the aircraft at a transonic speed at 302. The method 300 additionally includes generating an upload acting on the intermediate portion of the wing at 304 and generating a download acting on the strut at a location closer to the intermediate portion of the wing than the body at 306. In some implementations, the method 300 additionally includes increasing a first shockwave above the intermediate portion of the wing and decreasing a second shockwave between the intermediate portion of the wing and the strut.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. An aircraft, comprising:
   a body;
   a wing, coupled to and extending from the body, the wing comprising a wing inboard end portion, a wing outboard end portion, which is opposite the wing inboard end portion, and an intermediate portion between the wing inboard end portion and the wing outboard end portion; and
   a strut, comprising a strut inboard end portion and a strut outboard end portion, the strut inboard end portion is coupled to and extends from the body and the strut outboard end portion is coupled to and extends from the intermediate portion of the wing;
   wherein the strut outboard end portion of the strut is configured to generate a download acting on the strut outboard end portion of the strut when the aircraft is in flight;
   wherein the strut outboard end portion of the strut is twisted relative to the strut inboard end portion of the strut such that a negative angle of incidence at the strut outboard end portion of the strut is greater than at the strut inboard end portion of the strut; and
   wherein the intermediate portion of the wing is twisted relative to the wing inboard end portion of the wing such that a negative angle of incidence at the intermediate portion of the wing is less than at the wing inboard end portion.

2. The aircraft according to claim 1, wherein the intermediate portion of the wing is configured to generate an upload acting on the intermediate portion of the wing when the aircraft is in flight.

3. The aircraft according to claim 2, wherein a magnitude of the upload acting on the intermediate portion of the wing is greater than a magnitude of the download acting on the strut outboard end portion of the strut.

4. The aircraft according to claim 2, wherein the strut outboard end portion of the strut is further configured such that, in a spanwise direction away from the body and when the aircraft is in flight, a magnitude of the download acting on the strut outboard end portion of the strut generated by the strut outboard end portion of the strut increases.

5. The aircraft according to claim 4, wherein the intermediate portion of the wing is further configured such that, in the spanwise direction away from the body and when the aircraft is in flight, a magnitude of the upload acting on the intermediate portion of the wing generated by the intermediate portion of the wing increases.

6. The aircraft according to claim 1, wherein the strut inboard end portion of the strut is configured to generate an upload acting on the strut inboard end portion of the strut when the aircraft is in flight.

7. The aircraft according to claim 1, wherein:
the strut outboard end portion of the strut is twisted to define a first negative angle of incidence relative to a longitudinal axis of the aircraft;
the intermediate portion of the wing, defining a channel between the wing and the strut, is at a second negative angle of incidence relative to the longitudinal axis of the aircraft; and
the first negative angle of incidence is between about 50% and about 500% greater than the second negative angle of incidence of the intermediate portion of the wing.

8. The aircraft according to claim 7, wherein:
a maximum magnitude of the first negative angle of incidence is about 3-degrees;
a maximum magnitude of the second negative angle of incidence is about 1-degree.

9. The aircraft according to claim 1, wherein:
in a spanwise direction away from the body a magnitude of the first negative angle of incidence of the strut outboard end portion of the strut increases at a first rate and then decreases at a second rate; and
the second rate is greater than the first rate.

10. The aircraft according to claim 9, wherein:
in the spanwise direction away from the body a magnitude of a second negative angle of incidence of the intermediate portion of the wing increases at a third rate; and
the third rate is less than the first rate and the second rate.

11. The aircraft according to claim 1, wherein the wing has a span-to-chord ratio of at least 20:1.

12. The aircraft according to claim 1, wherein the aircraft is configured for travel at transonic speeds.

13. The aircraft according to claim 1, wherein:
the intermediate portion of the wing defines a first thinned portion;
an overall thickness of the first thinned portion of the wing decreases and increases in a spanwise direction along the wing away from the body;
the strut outboard end portion of the strut defines a second thinned portion;
the first thinned portion and the second thinned portion define an air flow channel between the first thinned portion and the second thinned portion; and
an overall thickness of the second thinned portion of the strut decreases and increases in a spanwise direction along the strut away from the body.

14. An aircraft, comprising:
a body;
a wing, coupled to and extending from the body, the wing comprising a wing inboard end portion, a wing outboard end portion, which is opposite the wing inboard end portion, and an intermediate portion between the wing inboard end portion and the wing outboard end portion; and
a strut, comprising a strut inboard end portion and a strut outboard end portion, the strut inboard end portion is coupled to and extends from the body and the strut outboard end portion is coupled to and extends from the intermediate portion of the wing;
wherein the strut outboard end portion of the strut is twisted relative to the strut inboard end portion of the strut such that a negative angle of incidence at the strut outboard end portion of the strut is greater than at the strut inboard end portion of the strut; and
wherein the intermediate portion of the wing is twisted relative to the wing inboard end portion of the wing such that a negative angle of incidence at the intermediate portion of the wing is less than at the wing inboard end portion.

15. The aircraft according to claim 14, wherein the strut outboard end portion of the strut is twisted to increase a negative angle of incidence, relative to a longitudinal axis of the aircraft, along the strut outboard end portion of the strut relative to the strut inboard end portion of the strut.

16. The aircraft according to claim 15, wherein the negative angle of incidence along the strut outboard end portion generates a download acting on the strut outboard end portion when the aircraft is in flight.

17. The aircraft according to claim 14, wherein:
the intermediate portion of the wing defines a first thinned portion;
an overall thickness of the first thinned portion of the wing decreases and increases in a spanwise direction along the wing away from the body;
the strut outboard end portion of the strut defines a second thinned portion;
the first thinned portion and the second thinned portion define an air flow channel between the first thinned portion and the second thinned portion; and
an overall thickness of the second thinned portion of the strut decreases and increases in a spanwise direction along the strut away from the body.

18. A method of reducing drag on an aircraft comprising a body, a wing, and a strut extending from the body to an intermediate portion of the wing, the method comprising:
flying the aircraft at a transonic speed;
generating an upload acting on the intermediate portion of the wing;
and
generating a download acting on the strut at the first location;
wherein:
a strut outboard end portion of the strut is twisted relative to a strut inboard end portion of the strut such that a negative angle of incidence at the strut outboard end portion is greater than at the strut inboard end portion; and
the intermediate portion of the wing is twisted relative to a wing inboard end portion of the wing such that a negative angle of incidence at the intermediate portion of the wing is less than at the wing inboard end portion.

19. The method of claim 18, further comprising:
increasing a first shockwave above the intermediate portion of the wing; and
decreasing a second shockwave between the intermediate portion of the wing and the strut.

20. The method of claim 18, wherein:
the intermediate portion of the wing defines a first thinned portion;
an overall thickness of the first thinned portion of the wing decreases and increases in a spanwise direction along the wing away from the body;
the strut outboard end portion of the strut defines a second thinned portion;
the first thinned portion and the second thinned portion define an air flow channel between the first thinned portion and the second thinned portion; and an overall thickness of the second thinned portion of the strut decreases and increases in a spanwise direction along the strut away from the body.

\* \* \* \* \*